United States Patent
Kim et al.

(10) Patent No.: US 7,339,983 B2
(45) Date of Patent: Mar. 4, 2008

(54) APPARATUS AND METHOD FOR DETECTING A POWER RATIO BETWEEN A TRAFFIC CHANNEL AND A PILOT CHANNEL IN A MOBILE COMMUNICATION SYSTEM

(75) Inventors: Hun-Kee Kim, Seoul (KR); Noh-Sun Kim, Suwon-shi (KR); Gin-Kyu Chol, Seoul (KR); Yong-Suk Moon, Suwon-Shi (KR); Kyung-Hyun Palk, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 686 days.

(21) Appl. No.: 10/630,842

(22) Filed: Jul. 31, 2003

(65) Prior Publication Data
US 2004/0048619 A1 Mar. 11, 2004

(30) Foreign Application Priority Data
Aug. 1, 2002 (KR) .................. 10-2002-0045527

(51) Int. Cl.
*H04B 3/46* (2006.01)
*H04B 17/00* (2006.01)
*H04B 1/707* (2006.01)

(52) U.S. Cl. .................. 375/224; 375/147; 455/226.1

(58) Field of Classification Search ............... 375/260, 375/261, 224, 259, 316, 377, 147, 340; 455/452.1, 455/67.11, 67.14, 226.1, 226.2
See application file for complete search history.

(56) References Cited

U.S. PATENT DOCUMENTS

| | | | |
|---|---|---|---|
| 5,835,541 A * | 11/1998 | Namekata et al. ........... 375/355 |
| 6,028,894 A * | 2/2000 | Oishi et al. ................ 375/227 |
| 6,393,257 B1 * | 5/2002 | Holtzman ................ 455/67.13 |
| 6,430,214 B1 * | 8/2002 | Jalloul et al. ............... 375/147 |
| 6,744,754 B1 | 6/2004 | Lee | |
| 7,170,923 B2 * | 1/2007 | Yeo et al. .................... 375/147 |
| 7,236,514 B2 * | 6/2007 | Bottomley et al. ......... 375/147 |
| 2001/0053128 A1 * | 12/2001 | Lee ............................ 370/244 |
| 2002/0110109 A1 * | 8/2002 | Kawaguchi et al. ........ 370/342 |
| 2002/0155854 A1 * | 10/2002 | Vanghi ....................... 455/522 |

FOREIGN PATENT DOCUMENTS

| | | |
|---|---|---|
| EP | 1089456 | 9/2000 |
| KR | 1020000004888 | 1/2000 |

\* cited by examiner

*Primary Examiner*—Betsy L. Deppe
(74) *Attorney, Agent, or Firm*—Roylance, Abrams, Berdo & Goodman, L.L.P.

(57) ABSTRACT

An apparatus and method for detecting a power ratio between a traffic channel and a pilot channel in a mobile communication system. The apparatus is operable to generate a second signal by performing channel estimation using a second channel signal, and generate a first signal by channel-compensating the first channel signal using the second signal. The apparatus is further operable to generate absolute values of symbols constituting the first signal, select absolute values in a predetermined length after sorting the absolute values in magnitude order, calculate an average value of the selected absolute values, calculate a square of an absolute value of the second signal, and generate the power ratio using a ratio of the average value to the square of the absolute value of the second signal.

39 Claims, 10 Drawing Sheets

APPARATUS AND METHOD FOR DETECTING A POWER RATIO BETWEEN A TRAFFIC CHANNEL AND A PILOT CHANNEL IN A MOBILE COMMUNICATION SYSTEM

PRIORITY

This application claims priority under 35 U.S.C. § 119 to an application entitled "Apparatus and Method for Detecting Power Ratio between Traffic Channel and Pilot Channel in a Mobile Communication System" filed in the Korean Intellectual Property Office on Aug. 1, 2002 and assigned Serial No. 2002-45527, the contents of which are incorporated herein by reference.

BACKGROUND OF THE INVENTION

1. Field of the Invention

The present invention relates generally to a mobile communication system, and in particular, to an apparatus and method for detecting a power ratio between a traffic channel and a pilot channel in a mobile communication system for high-speed data transmission.

2. Description of the Related Art

Mobile communication systems have evolved from a conventional communication system that supports a voice-centered service into an advanced communication system that supports a high-capacity data-centered service such as a data service and a multimedia service. Thus, the mobile communication system is evolving into a high-speed, high-quality packet communication system in order to enable high-capacity data transmission. For example, high speed downlink packet access (hereinafter referred to as "HSDPA") proposed in $3^{rd}$ Generation Partnership Project (3GPP), standard for $3^{rd}$ generation asynchronous mobile communication system, or Enhanced Variable-Data Voice (1xEV-DV) proposed in $3^{rd}$ Generation Partnership Project 2 (3GPP2), standard for $3^{rd}$ generation synchronous mobile communication system, is a technology proposed for high-capacity, high-speed data transmission. The HSDPA technology is the general term for a high speed downlink shared channel (hereinafter referred to as "HS-DSCH") which is a downlink data channel for supporting high speed downlink packet data transmission, its associated control channels, for an apparatus, system and method in a wideband code division multiple access (hereinafter referred to as "W-CDMA") communication system.

In a high-speed packet data transmission system, a technique for adjusting a modulation scheme and a coding scheme according to a radio channel condition has been proposed to transmit high-speed data within a limited frequency band. Particularly, adaptive modulation and coding (hereinafter referred to as "AMC") has recently been proposed for HSDPA. The AMC technique will now be described herein blow.

AMC refers to a data transmission technique in which a modulation scheme and a coding scheme are determined according to a channel condition between a cell, or Node B, and a user equipment (hereinafter referred to as "UE"). Thus, AMC improves the utilization efficiency of the cell. The AMC includes a plurality of modulation schemes and a plurality of coding schemes, and modulates and codes a channel signal by combining the modulation schemes with the coding schemes. Specifically, each combination of the modulation schemes and the coding schemes is called a modulation and coding scheme (hereinafter referred to as "MCS"), and a plurality of MCSs with level #1 to level #N can be defined according to the number of the MCSs. The AMC technique adaptively determines an MCS level according to a channel condition between a UE and a Node B in which the Node B is wirelessly connected to the UE, thereby improving the entire system efficiency of the Node B. In AMC, Quadrature Phase Shift Keying (QPSK), 8-ary Phase Shift Keying (8PSK) and 16-ary Quadrature Amplitude Modulation (16QAM) are considered for the modulation scheme, and various coding rates of ¼ to 1 are considered for the coding scheme. Although the following description will be made with reference to an asynchronous HSDPA communication system for the convenience of explanation, the following description can also be applied to other mobile communication systems for high-speed data transmission.

When AMC is applied, for UEs having a good channel condition such as the UEs being located in the vicinity of a Node B, i.e., UEs using channels having good quality, a high-order modulation scheme, for example, 8PSK and 16QAM, and a high coding rate are used. In contrast, for UEs located in a remote distance from the Node B, UEs having a poor channel condition such as UEs existing in a cell boundary position, and UEs using channels having poor quality, a low-order modulation scheme, for example, QPSK, and a low coding rate are used. In the case of low-order modulation schemes, especially QPSK used in a conventional $3^{rd}$ generation mobile communication system, one symbol is located in each quadrant on its constellation, so channel compensation can be performed with only phase estimation. However, in the case of a high-order modulation scheme such as 8PSK or 16QAM, a plurality of symbols are located in each quadrant on its constellation, and a plurality of symbols having different amplitudes can be located in the same phase, so precise estimation for not only phase but also amplitude is required for channel compensation.

As stated above, the modulation scheme and the coding rate applied when a high-speed, high-quality service is provided in a mobile communication system are adaptively used according to a radio channel environment. In addition, when data is transmitted by applying a high-order modulation scheme and a low coding rate, a primary factor of reducing reception of the transmitted data generally occurs in a channel environment between a Node B and a UE. The channel environment that reduces data reception includes an additive white Gaussian noise (hereinafter referred to as "AWGN"), a variation in power of a reception signal due to fading, a Doppler effect due to movement of a UE and a variation in moving speed of the UE, and interference caused by other UEs and multipath signals. Since an original transmission signal is distorted according to a radio channel environment before being received at a receiver, there is a demand for an apparatus for compensating for the distortion in the received signal so that it resembles the transmitted signal. The apparatus is called a "channel estimator."

In HSDPA, a Node B transmits a common pilot channel (CPICH) signal for channel estimation so that all UEs can receive the CPICH signal. Even in 1xEV-DV for a synchronous system, a base station (BS) transmits a pilot channel (PICH) signal for channel estimation so that all mobile stations (MSs) can receive the PICH signal. In the following description, since both the common pilot channel signal and the pilot channel signal are used for channel estimation, they will be commonly referred to as a "pilot channel," for purposes of simplicity. The pilot channel is set up between the Node B and the UEs to transmit a pilot signal, and a reception side, or a UE, estimates a channel condition, especially a channel fading phenomenon, between the Node B and the UE by receiving the pilot channel signal. The estimated channel fading is used in restoring a received signal distorted due to a fading phenomenon back to an original signal which was transmitted by the transmission side. Also, the estimated channel fading is used in estimating a power ratio between a traffic channel and a pilot channel (traffic vs. pilot channel power ratio).

The power ratio estimation between a traffic channel and a pilot channel is a necessary procedure for demodulating a signal modulated in a high-order modulation scheme such as 16QAM and 64QAM. If information on the power ratio between a traffic channel and a pilot channel is provided from a transmission side, or a Node B, to a reception side, or a UE, there is no necessity to estimate the power ratio between a traffic channel and a pilot channel. However, a high-speed packet transmission system employing 1xEV-DV or HSDPA in which a high-order modulation scheme of 16QAM or higher order is used is designed so that the estimation should be performed in the reception side in order to remove a signaling load. A method of estimating a power ratio between a traffic channel and a pilot channel at the reception side called "blind power ratio detection" can be used instead of the method of providing information on the power ratio between a traffic channel and a pilot channel from the transmission side to the reception side through signaling. However, primary factors of reducing the blind power ratio detection occurs at the reception side, and the primary factors of reducing the blind power ratio detection are roughly classified into three factors: channel noise, fading phenomenon, and unequal average power.

The unequal average power will now be described with reference to FIG. 1.

FIG. 1 is a graph illustrating an example of a general constellation for 16QAM. Referring to FIG. 1, when a high-order modulation scheme such as 16QAM is applied, respective symbols have different power levels. For example, power of 4 inner symbols being adjacent to a coordinate (0,0) on the constellation becomes $P_{in}=2A^2$, power of 8 middle symbols on the constellation becomes $P_{middle}=10A^2$, and power of 4 outer symbols on the constellation becomes $P_{outer}=18A^2$. Thus, the total average power of the 4 inner symbols, the 8 middle symbols and the 4 outer symbols becomes $$P_{total} = \frac{2A^2 + 10A^2 + 18A^2}{3} = 10A^2,$$

and if A=0.3162, the total average power $P_{total}$ becomes 1. In the following description, it will be assumed that A=0.3162, a particular symbol is represented by $S_i$, and power of the corresponding symbol is represented by $<S_i>$. Here, i is an identifier for identifying a data channel and a pilot channel. If i=d, the i indicates a data channel, while if i=p, the i indicates a pilot channel. For example, $<S_d>$ represents power of a corresponding symbol on a data channel.

The data symbols are transmitted over a traffic channel, and the traffic channel is transmitted together with a pilot channel. A transmission signal transmitted by a transmission side, or a Node B, is expressed as $$Tx = W_d A_d S_d + W_p A_p S_p \quad (1)$$

In equation (1), $W_i$ is a Walsh code which is a spreading code, so $W_d$ represents a Walsh code used for a traffic channel and $W_p$ represents a Walsh code used for a pilot channel. Further, in Equation (1), $A_i$ is a channel gain, so $A_d$ represents a channel gain of a traffic channel and $A_p$ represents a channel gain of a pilot channel. Moreover, in Equation (1), $S_i$ represents each of symbols constituting a packet as mentioned above, $S_d$ represents a symbol on a traffic channel, and $S_p$ represents a symbol on a pilot channel. However, the $S_p$ uses a pattern previously agreed between a transmission side, or a Node B, and a reception side, or a UE.

A communication system employing HSDPA (hereinafter referred to as an "HSDPA communication system") transmits a signal by the packet, and one packet is comprised of a plurality of time slots. A transmission unit by the packet is a transmission time interval (hereinafter referred to as "TTI"), and one TTI is comprised of 3 time slots. Further, the number of symbols transmitted for one time slot is variable according to a spreading factor (hereinafter referred to as "SF") applied to the corresponding time slot. In the HSDPA communication system, SF=16 is generally used, so 480 symbols are transmitted for each packet. As a result, 160 symbols are transmitted for each time slot.

In 16QAM, one symbol is comprised of 4 bits, so 1920 bits are randomly generated for each packet, and in QPSK, one symbol is comprised of 2 bits, so 960 bits are randomly generated for each packet. In the case of 16QAM, when one packet is transmitted, 480 symbols are transmitted, and if the 480 symbols are evenly generated as 120 inner symbols, 240 middle symbols and 120 outer symbols, average power of the 480 symbols within one packet will become 1 ($<S_i>=1$). However, generally, the 480 symbols within one packet are not uniformly generated as 120 inner symbols, 240 middle symbols and 120 outer symbols as stated above in view of a characteristic of data. For example, when 1920 bits constituting the 480 symbols are all generated with 0, the 480 symbols are all generated as inner symbols of A+jA on the constellation illustrated in FIG. 1. Thus, average power $<S_i>$ of the 480 symbols becomes 0.2 ($<S_i>=0.2$). If average power $<S_i>$ of the 480 symbols is 0.2, a reception side cannot but estimate the average power $<S_i>$ as 0.2, even when there is no noise or distortion. In contrast, however, if 1920 bits constituting the 480 symbols are all generated with 1, the 480 symbols are all generated as outer symbols of 3A+3jA on the constellation illustrated in FIG. 1, so average power $<S_i>$ of the 480 symbols becomes 1.8 ($<S_i>=1.8$). Likewise, if average power $<S_i>$ of the 480 symbols is 1.8, the reception side cannot but estimate the average power $<S_i>$ as 1.8, even though there is no noise or distortion. The uneven average power of a transmission signal, which is not 1, is called "unequal average power."

A characteristic of the unequal average power will now be described with reference to FIG. 2.

FIG. 2 is a graph illustrating an example of a general characteristic of unequal average power when 16QAM is applied. Specifically, FIG. 2 illustrates a characteristic of a probability density function (hereinafter referred to as "PDF") for average power of a transmission packet when 90% of transmission power is applied to a traffic channel on the assumption that the total transmission power is 1. If the 480 symbols are uniformly generated as 120 inner symbols, 240 middle symbols and 120 outer symbols during transmission of one packet, average power p of a traffic channel becomes 0.9 ($P=A^2_d<S_d>=A^2_d=0.9$). However, as mentioned above, there is a rare case where 480 symbols are ideally uniformly generated as 120 inner symbols, 240 middle symbols and 120 outer symbols during transmission of one packet. Generally, PDF shows a distribution characteristic with mean m=0.9 and standard deviation σ=0.0232.

If transmission power assigned to a traffic channel is 90% of the total transmission power ($A^2_d$=0.9), average power $<S_d>$ of traffic channel symbols is not 1 but 0.9, and the traffic channel symbols are received at a reception side together with AWGN having power of 0.2 (<N>0.2), then a power ratio between a traffic channel and a pilot channel is detected in the following way by using an accumulation averaging technique of a traffic channel which is a general blind power ratio detection technique. Here, <N> represents average power of a noise. A description will now be made of a procedure for detecting a power ratio between a traffic channel and a pilot channel in the accumulation averaging technique.

If it is assumed that a channel is mixed with the AWGN, a reception side receives a signal defined as $$Rx = W_d A_d S_d + W_p A_p S_p + N \quad (2)$$

If only a traffic channel signal is separated from the received signal Rx of Equation (2), the separated traffic channel signal is expressed by Equation (3) below. In order to separate only a traffic channel signal from the received signal Rx, a transmission side simply multiplies the received signal Rx by the same Walsh code as a Walsh code applied to the traffic channel, for despreading.

$$Rx_d = A_d S_d + N \quad (3)$$

In Equation (3), $Rx_d$ is a received signal for which only a traffic channel signal is considered. In order to calculate a channel gain $A_d$ applied to the traffic channel, accumulated average power is calculated by $$P = A^2_d <S_d> + <N> \quad (4)$$

In Equation (4), P represents accumulated average power, i.e., accumulated average power of a traffic channel. If it is assumed in Equation (4) that $<S_d>=1$ and $<N>=0$, i.e., if average power and noise power of symbols within a packet transmitted over a traffic channel are 1 and 0, respectively, then the accumulated average power can be detected as $P=A^2_d$=0.9. However, if $<S_d>$=0.9 and <N>=0.2 as assumed above, $P=A^2_d<S_d>+<N>$=1.01. In this case, $P \neq A^2_d$, so it is not possible to detect correct $A^2_d$.

A general structure of a receiver in a mobile communication system will now be described with reference to FIG. 3.

FIG. 3 is a block diagram illustrating an example of a general structure of a receiver in a mobile communication system. Referring to FIG. 3, a reception signal Rx received at the receiver after passing a fading channel, i.e., after suffering a fading phenomenon, can be defined as $$Rx = \alpha \cdot (W_d A_d S_d + W_p A_p S_p) e^{-j\theta} + N) \quad (5)$$

In Equation (5), $\alpha e^{-j\theta}$ represents distortion of amplitude and phase due to a fading channel. Specifically, α represents amplitude distortion, and $e^{-j\theta}$ represents phase distortion. The other components in Equation (5) are equal to those described in conjunction with Equation (1).

The reception signal Rx expressed by Equation (5) is applied to a despreader 310, and the despreader 310 despreads the reception signal Rx with a predetermined spreading code to separate the reception signal Rx into a traffic channel signal and a pilot channel signal, and provides the traffic channel signal to a channel compensator 320 and the pilot channel signal to a channel estimator 330. That is, the despreader 310 despreads the reception signal Rx using the same spreading code as a spreading code applied to a traffic channel in a transmitter to separate a traffic channel signal from the reception signal Rx, and provides the traffic channel signal to the channel compensator 320. Further, the despreader 310 despreads the reception signal Rx using the same spreading code as a spreading code applied to a pilot channel in the transmitter to separate a pilot channel signal from the reception signal Rx, and provides the pilot channel signal to the channel estimator 330. The traffic channel signal output from the despreader 310 is represented by $\alpha A_d S_d e^{-j\theta}+N$, and the pilot channel signal output from the despreader 310 is represented by $\alpha A_p S_p e^{-j\theta}+N$.

Meanwhile, the channel estimator 330, when it operates ideally, detects $A_p \alpha e^{-j\theta}$ by multiplying the pilot channel signal by a complex conjugate $S_p^*=1-j$ of a pilot symbol $S_p=1+j$ previously agreed upon between the transmitter and a receiver and normalizing the multiplication result, and then outputs a complex conjugate value of a fading channel, and the complex conjugate value is represented by $$(A_p \alpha e^{-j\theta})^* \quad (6)$$

As a result, the signal $(A_p \alpha e^{-j\theta})^*$ output from the channel estimator 330 becomes an estimation value of a pilot channel for which a fading phenomenon was considered. The channel estimator 330 provides the $(A_p \alpha e^{-j\theta})^*$ to the channel compensator 320 and a power ratio detector 340. The power ratio detector 340 serves as a traffic-versus-pilot channel power ratio detector for detecting a power ratio between a traffic channel and a pilot channel.

The channel compensator 320 performs channel compensation on the traffic channel by using the $(A_p \alpha e^{-j\theta})^*$ output from the channel estimator 330, and the channel-compensated traffic channel signal is expressed as $$\alpha A_d S_d e^{-j\theta} + N \times (A_p \alpha e^{-j\theta})^* = |\alpha|^2 A_d A_p S_d + N' \quad (7)$$

The channel compensator 320 generates a channel compensation signal $|\alpha|^2 A_d A_p S_d + N'$ by multiplying the despread traffic channel signal $\alpha A_d S_d e^{-j\theta}+N$ by the channel estimation signal $(A_p \alpha e^{-j\theta})^*$ output from the channel estimator 330, and provides the generated channel compensation signal $|\alpha|^2 A_d A_p S_d + N'$ to the power ratio detector 340. That is, the channel compensation signal $|\alpha|^2 A_d A_p S_d + N'$ output from the channel compensator 320 becomes a signal phase-compensated multiplying the traffic channel signal $\alpha A_d S_d e^{-j\theta}+N$ output from the despreader 310 by the channel estimation signal $(A_p \alpha e^{-j\theta})^*$ output from the channel estimator 330. The power ratio detector 340 detects a power ratio between a traffic channel and a pilot channel by using the channel-compensated signal $|\alpha|^2 A_d A_p S_d + N'$ output from the channel compensator 320 and the channel estimation signal $(A_p \alpha e^{-j\theta})^*$ output from the channel estimator 330.

An operation of the power ratio detector 340 will now be described herein below.

The power ratio detector 340 first detects accumulated average power of the channel compensation signal $|\alpha|^2 A_d A_p S_d + N'$ output from the channel compensator 320. The accumulated average power for the channel compensation signal $|\alpha|^2 A_d A_p S_d + N'$ is defined as $$|\alpha|^4 (A_d A_p)^2 <S_d> + <N'> \quad (8)$$

In Equation (8), in an ideal case, $<S_d>=1$ and $<N'>=0$, so accurate $|\alpha|^4 (A_d A_p)^2$ can be detected. However, in an actual radio channel environment, $<S_d> \neq 1$ and $<N'> \neq 0$, so Equation (8) can rewritten as $$\overline{|\alpha|^4 (A_d A_p)^2} \quad (9)$$

The accumulated average power is expressed as $\overline{|\alpha|^4 (A_d A_p)^2}$ in Equation (9) since $<S_d> \neq 1$ and $<N'> \neq 0$, it becomes a value different from the accumulated average power $|\alpha|^4(A_d A_p)^2$ in the ideal case. A square root of the accumulated average power represented by Equation (9) is expressed as $$\sqrt{|\alpha|^4(A_d A_p)^2} = |\alpha|^2(A_d A_p) \quad (10)$$

The power ratio detector 340 detects a power ratio between a traffic channel and a pilot channel by calculating the square root of the accumulated average power shown in Equation (10) as a square of the channel estimation signal $(A_{p\alpha e}{}^{-j\theta})^*$ output from the channel estimator 330, and this can be expressed as $$\frac{\sqrt{|\alpha|^4(A_d A_p)^2 <S_d> + <N'>}}{|\alpha|^2 A_p^2} = \frac{|\alpha|^2(A_d A_p)}{|\alpha|^2 A_p^2} = \frac{A_d}{A_p} \quad (11)$$

In Equation (11), if $<S_d> \neq 1$ and $<N'> \neq 0$, the output of the power ratio detector 340 includes not only the power ratio $$\frac{A_d}{A_p}$$

between a traffic channel and a pilot channel but also an error component. In addition, since $<S_d> \neq 1$, it will be assumed that $<S_d>1+\Delta<S_d>$. Then, the output of the power ratio detector 340 is expressed as $$\frac{\sqrt{|\alpha|^4(A_d A_p)^2 <S_d> + <N'>}}{|\alpha|^2 A_p^2} = \sqrt{\left(\frac{A_d}{A_p}\right)^2 + \text{error}} \quad (12)$$

In Equation (12), an error component is $$\Delta<S_d> \cdot \left(\frac{A_d}{A_p}\right)^2 + \frac{<N'>}{|\alpha|^4 A_p^4}.$$

Meanwhile, a demodulator 350 receives a channel compensation signal $|\alpha|^2 A_d A_p S_d + N'$ output from the channel compensator 320 and rearranges the channel compensation signal $|\alpha|^2 A_d A_p S_d + N'$ as shown in Equation (13) below.

$$|\alpha|^2 A_d A_p S_d + N' = (|\alpha|^2 A_p^2) \cdot \left(\frac{A_d}{A_p}\right) S_d + N' \quad (13)$$

Before actually demodulating a traffic channel signal, the demodulator 350 separates the channel compensation signal output from the channel compensator 320 into a traffic channel signal and a noise component by dividing the channel compensation signal by a signal output from the power ratio detector 340, and this can be expressed as $$\frac{(|\alpha|^2 A_p^2) \cdot \left(\frac{A_d}{A_p}\right) S_d + N'}{(|\alpha|^2 A_p^2) \cdot \left(\frac{A_d}{A_p}\right)} = S_d + \frac{N'}{(|\alpha|^2 A_p^2) \cdot \left(\frac{A_d}{A_p}\right)} = S_d + N'' \quad (14)$$

In Equation (14), N" is a noise component.

Then, the demodulator 350 demodulates the signal of Equation (14) by the bit by using the constellation described in conjunction with FIG. 1, and outputs the demodulation result to a turbo decoder 360. The turbo decoder 360 decodes an output signal of the demodulator 350 in a turbo decoding scheme corresponding to a turbo encoding scheme applied in the transmitter, and outputs its original information bits.

As described above, when power of a noise mixed in a received signal fails to be removed, the general blind power ratio detection technique, especially the blind power ratio detection technique based on the accumulation averaging technique has difficulty in performing accurate blind power ratio detection due to the noise power. That is, since a noise component is included in the signal output from the power ratio detector 340 as a power component as described in conjunction with Equation (12), it is difficult to remove the noise component. In addition, the accumulation averaging technique can be directly affected by the unequal average power problem and is sensitive to a fading phenomenon, making it difficult to perform blind power ratio detection. When a signal is transmitted using a high-order modulation scheme in an HSDPA communication system, the general blind power ratio detection technique, especially the accumulation averaging technique has difficulty in modulating the transmitted signal.

SUMMARY OF THE INVENTION

It is, therefore, an object of the present invention to provide an apparatus and method for detecting a power ratio between a traffic channel and a pilot channel in a mobile communication system for high-speed data transmission.

It is another object of the present invention to provide a traffic-versus-pilot channel power ratio detection apparatus and method for minimizing an unequal average power problem in a mobile communication system for high-speed data transmission.

It is further another object of the present invention to provide a traffic-versus-pilot channel power ratio detection apparatus and method for minimizing an error caused by a noise component in a mobile communication system for high-speed data transmission.

It is yet another object of the present invention to provide a traffic-versus-pilot channel power ratio detection apparatus and method for minimizing an error caused by a fading channel in a mobile communication system for high-speed data transmission.

To achieve the above and other objects, the invention provides an apparatus for detecting a power ratio between a first channel and a second channel in a mobile communication system. The apparatus comprises a channel estimator for generating a first signal by performing channel estimation using the first channel signal; a channel compensator for generating a second signal by channel-compensating the second channel signal using the first signal; and a power ratio detector for generating absolute values of symbols constituting the second signal, selecting absolute values in a predetermined length after sorting the absolute values in magnitude order, calculating an average value of the selected absolute values, calculating a square of an absolute value of the first signal, and generating the power ratio using a ratio of the average value to the square of the absolute value of the first signal.

To achieve the above and other objects, the invention provides a method for detecting a power ratio between a first channel and a second channel in a mobile communication system. The method comprises generating a first channel signal by performing channel estimation using the first channel signal; generating a second signal by channel-compensating the second channel signal using the first signal; and generating absolute values of symbols constituting the second signal, selecting absolute values in a predetermined length after sorting the absolute values in magnitude order, calculating an average value of the selected absolute values, calculating a square of an absolute value of the first signal, and generating the power ratio using a ratio of the average value to the square of the absolute value of the first signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several embodiments of the present invention will now be described in detail with reference to the accompanying drawings. In the following description, a detailed description of known functions and configurations has been omitted for conciseness.

Figure 4:
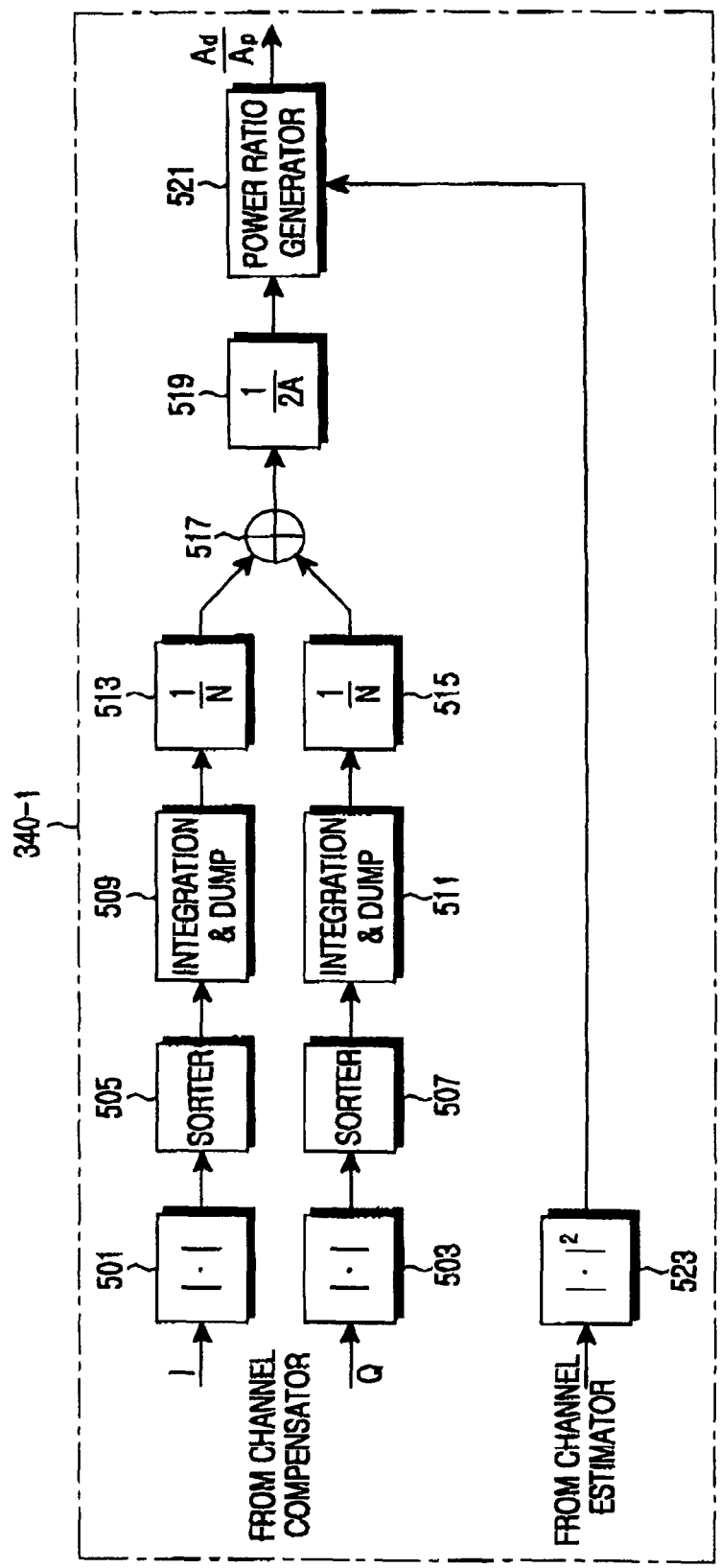
FIG. 4 is a block diagram illustrating an example of an internal structure of a power ratio detection apparatus for detecting a power ratio between a traffic channel and a pilot channel according to an embodiment of the present invention.

FIG. 4 is a block diagram illustrating an example of an internal structure of a power ratio detection apparatus for detecting a power ratio between a traffic channel and a pilot channel according to an embodiment of the present invention.

Figure 3:
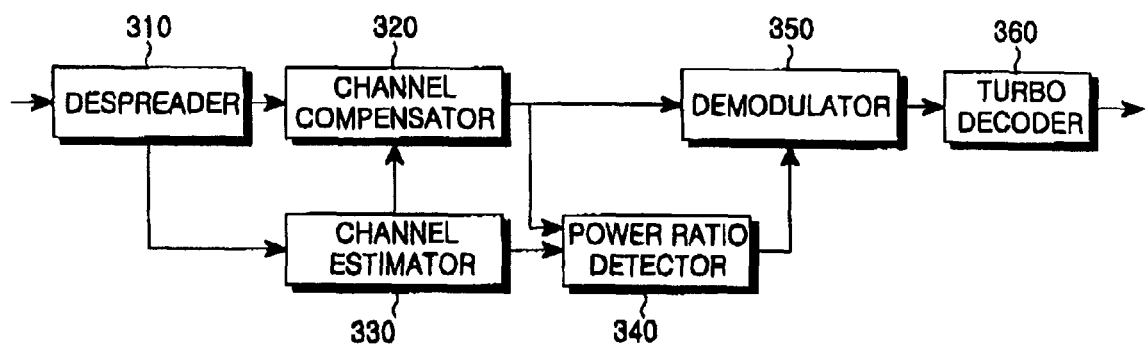
FIG. 3 is a block diagram illustrating an example of a general internal structure of a receiver in a mobile communication system.

It should be noted that the embodiment of the present invention shown in FIG. 4 applies substantially the same receiver structure as the general receiver structure described in conjunction with FIG. 3 except that the structure of the power ratio detector 340 has been modified in accordance with an embodiment of the present invention to enable efficient power ratio detection, i.e., traffic-versus-pilot channel power ratio detection. Therefore, it should be noted that input/output signals of the despreader 310, the channel compensator 320 and the channel estimator 330 are substantially equal to the input/output signals described in the related art section. Although a blind power ratio detector of the invention is assigned the same reference numeral as that of the power ratio detector 340 described in the related art section for the convenience of explanation, they operate in different ways.

Referring to FIG. 4, the power ratio detector 340-1, as described in conjunction with FIG. 3, receives a channel compensation signal $|\alpha|^2 A_d A_p S_d + N'$ output from the channel compensator 320 and a channel estimation signal $(A_p \alpha e^{-j\theta})^*$ output from the channel estimator 330. The power ratio detector 340-1 separates the channel compensation signal $|\alpha|^2 A_d A_p S_d + N'$ output from the channel compensator 320 into a real part (I component) and an imaginary part (Q component), and this is expressed as $$|\alpha|^2 A_d A_p S_d + N' = (|\alpha|^2 A_d A_p S_{dI} + N_I') + j(|\alpha|^2 A_d A_p S_{dQ} + N_Q') \qquad (15)$$

From Equation (15), the real part and the imaginary part can be written as $$I = |\alpha|^2 A_d A_p S_{dI} + N_I'), \ Q = j(|\alpha|^2 A_d A_p S_{dQ} + N_Q') \qquad (16)$$

Figure 1:
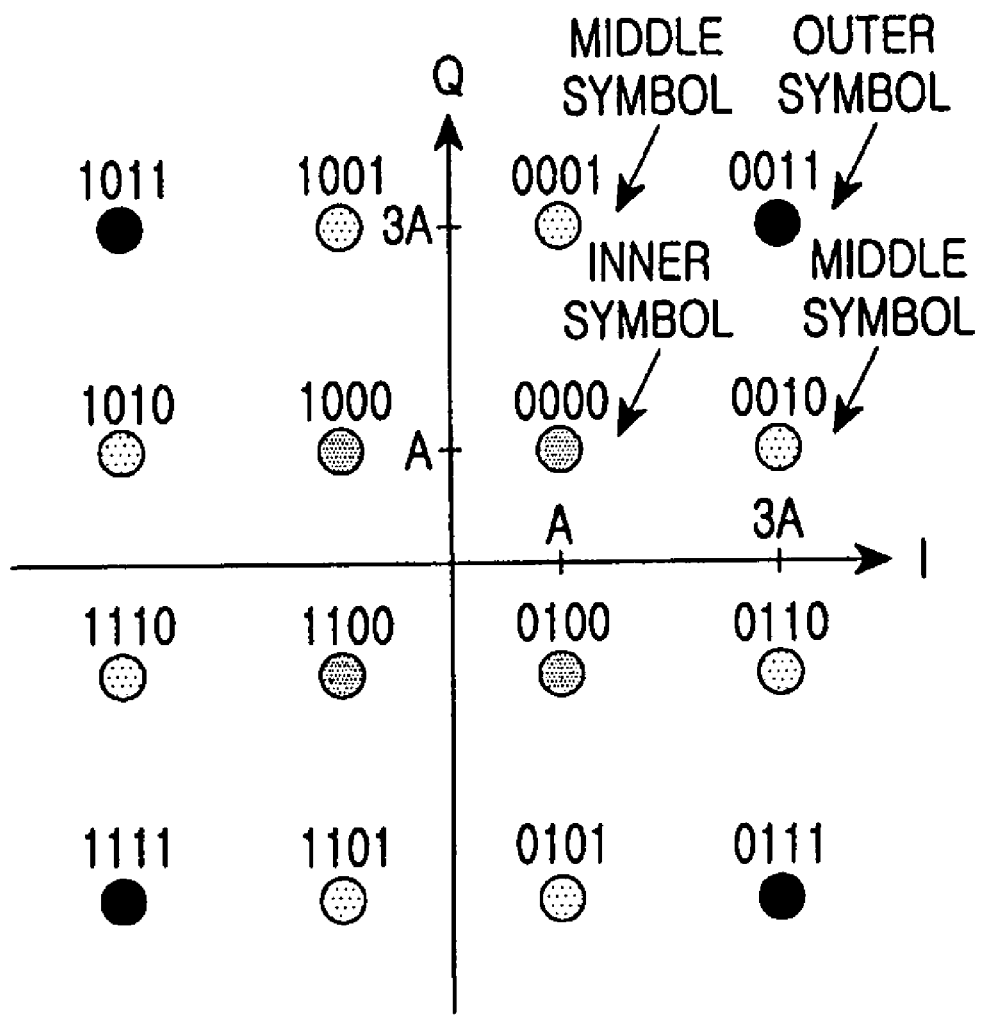
FIG. 1 is a graph illustrating an example of a general constellation for 16QAM.
Figure 2:
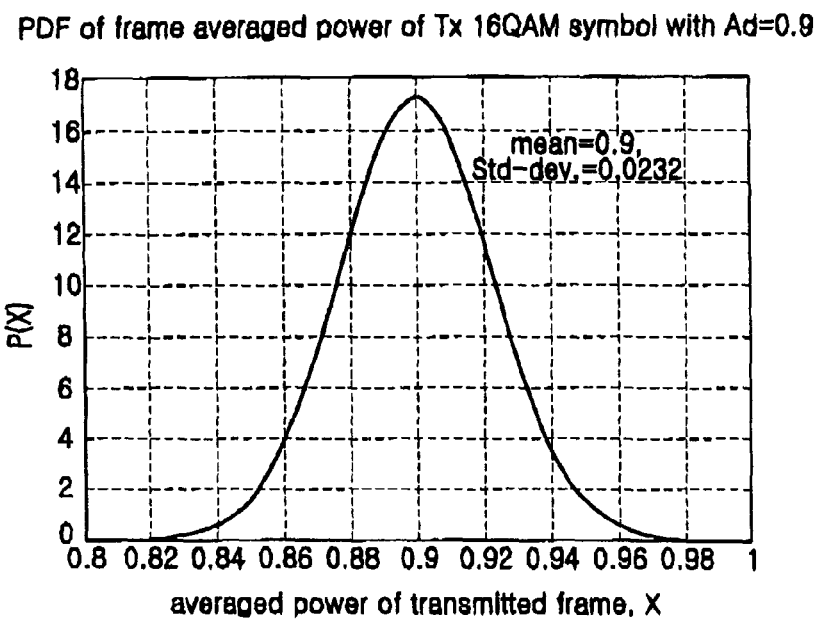
FIG. 2 is a graph illustrating an example of a general characteristic of unequal average power when 16QAM is applied.

Meanwhile, when 16-ary Quadrature Amplitude Modulation (16QAM) is applied, all symbols on the constellation described in conjunction with FIG. 1 have amplitudes of A and 3A. That is, since a real part and an imaginary part of each symbol satisfy $S_{dI}, S_{dQ} \in \{\pm A, \pm 3A\}$, they also satisfy $|S_{dI}|, |S_{dQ}| \in \{A, 3A\}$. Although the present invention can be practiced using other modulation schemes of a higher order, for example, 64QAM, without departing from the scope of the invention, the invention will be described with reference to 16QAM, for the convenience of explanation.

In 16QAM, a real part and an imaginary part of a channel compensation signal both optionally have a value of any one of A and 3A, which are defined as $$A\_term = (A_d A_p) A, \ 3A\_term = (A_d A_p) 3A \qquad (17)$$

Therefore, when absolute values of a real part and an imaginary part of a channel compensation signal described in conjunction with Equation (16) are calculated and then classified into A and 3A defined in Equation (17), they are expressed as $$|I| = \left|(|\alpha(n)|^2 A_d A_p) \cdot A + N_I'(n)\right| + \qquad (18)$$
$$\left|(|\alpha(n)|^2 A_d A_p) \cdot 3A + N_I'(n)\right|$$
$$|Q| = \left|(|\alpha(n)|^2 A_d A_p) \cdot A + N_Q'(n)\right| +$$
$$\left|(|\alpha(n)|^2 A_d A_p) \cdot 3A + N_Q'(n)\right|$$

The reason for calculating absolute values of a real part and an imaginary part of the channel compensation signal in Equation (18) is because when absolute values are calculated on the constellation, all symbols can be classified into A and 3A. In Equation (18), n represents an order of a corresponding symbol among symbols constituting one packet, and the n has a value of 1 to the number of symbols constituting the packet, for example, a value of 1 to 480. The number of symbols constituting one packet is assumed to be 480 because a communication system employing high speed downlink packet access (hereinafter referred to as an "HSDPA communication system"), which is a communication system for high-speed data transmission, generally transmits 480 symbols per packet by using a spreading factor (SF) of SF=16. In addition, since the number of symbols constituting one packet is 480, 160 symbols are transmitted for each time slot. 160 symbols are transmitted for each time slot because in the HSDPA communication system, one Transmission Time Interval (TTI) is comprised of 3 time slots. When the real part and the imaginary part shown in Equation (18) each are continuously sorted from their minimum value to maximum value and then the sorted values are divided into a predetermined number of predetermined lengths. For example, the sorted values may be divided into two equal parts. Further, it is possible to separate the sorted values into smaller values and larger values. A reference point where the sorted values are halved becomes a point where the number of symbols within one packet becomes ½. That is, since the invention is applied to the HSDPA communication system, a boundary point between a $240^{th}$ symbol and a $241^{st}$ symbol among 480 symbols becomes the reference point. The reference point may be preset. In addition, when the sorted values are divided into two equal parts, a part where the smaller values exist will be defined as "low_part," while a part where the larger values exist will be defined as "high_part."

The low_part and the high_part will now be described with reference to FIG. 5.

Figure 5:
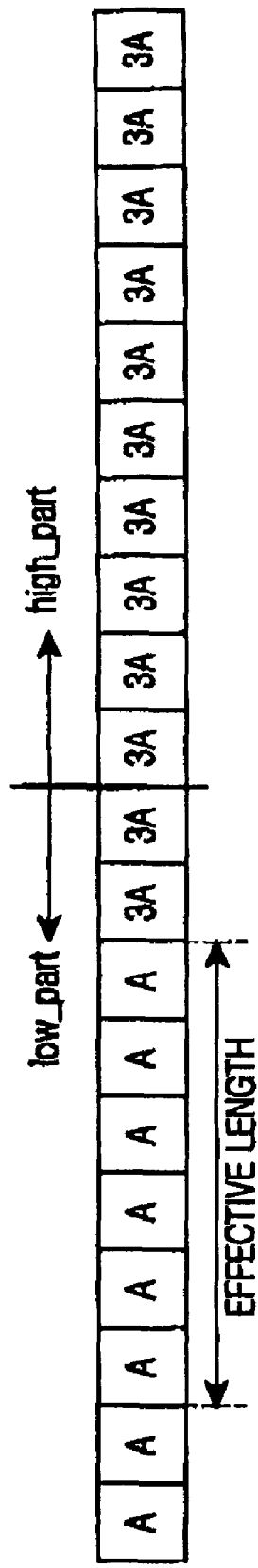
FIG. 5 is a block diagram illustrating an example of an effective length in 16QAM to practice the invention according to an embodiment of the present invention.

FIG. 5 is a block diagram illustrating an example of an effective length in 16QAM to practice the invention according to an embodiment of the present invention. Referring to FIG. 5, when there is no noise or fading phenomenon on a radio channel, all symbols within one packet are sorted from a minimum value to a maximum value according to their amplitudes. The sorted values are then divided into two equal parts low_part and high_part. In this case, the low_part has symbols having amplitude A, while the high_part has symbols having amplitude 3A. However, in an actual radio channel environment, there is a rare case where there is no noise or fading phenomenon, and even an unequal average power problem occurs. The term "unequal average power," as described in the related art section, refers to average power where the average power of a transmission signal transmitted by a transmitter becomes a value other than 1. Therefore, when all symbols within one packet are sorted from a minimum value to a maximum value according to their amplitudes and then the sorted values are divided into two equal parts low_part and high_part, the low_part includes not only the symbols having amplitude A but also the symbols having amplitude 3A. The symbols having amplitude 3A existing in the low_part are symbols generated due to the unequal average power problem. Of course, in FIG. 5, symbols represented by A among the symbols existing in the low_part may have either the same value as A or a value approximating the A in an actual radio channel environment, and symbols represented by 3A among the symbols existing in the high_part may have either the same value as 3A or a value approximating to the 3A in the actual radio channel environment.

The effective length illustrated in FIG. 5 will now be described in detail herein below.

First, the symbols within one packet are classified into in-phase (I) channel components and quadrature-phase (Q) channel components. The classified I channel components are classified again into low_part and high_part according to their amplitudes, and the classified Q channel components are also classified again into low_part and high_part according to their amplitudes, as expressed in Equation (19) below.

$$\text{sort}(|I|) = (\text{low\_part})_I + (\text{high\_part})_I$$
$$\text{sort}(|Q|) = (\text{low\_part})_Q + (\text{high\_part})_Q \qquad (19)$$

In Equation (19), when fading channel magnitudes α(n) applied to all symbols within one packet are ideally equal and $<S_d>=1$, i.e., when no unequal average power problem occurs and there is no noise component, the low_parts, i.e., $(\text{low\_part})_I$ and $(\text{low\_part})_Q$, both can be represented by A terms. However, in an actual radio channel environment, since fading channel magnitudes α(n) applied to all symbols within one packet are unequal and $<S_d>\neq1$, the unequal average power problem occurs and there exists a noise component. In this case, therefore, the low_part is comprised of a large number of A terms and a small number of 3A terms. Like the low_part, the high_part is also comprised of a large number of 3A terms and a small number of A terms, since fading channel magnitudes α(n) applied to all symbols within one packet are unequal, $<S_d>\neq1$ and there exists a noise component.

There are three reasons why the 3A terms are partially included in the low_part.

A first reason is a fading phenomenon. In this case, it will be assumed that no noise component and no unequal average power problem occur.

When $$|\alpha(n)|^2 A_d A_p < \frac{2}{3},$$

a corresponding symbol is included in a low_part, crossing over a 2A boundary that classifies A and 3A on the constellation. That is, in an ideal case, a condition of $|\alpha(n)|^2 A_d A_p = 1$ should be satisfied, but 3A terms are included in the low_part due to the influence of the fading channel magnitude α(n).

A second reason is a noise component. In this case, it will be assumed that no fading phenomenon and no unequal average power problem occur.

When only the noise component is considered, since there is no fading phenomenon, $|\alpha(n)|^2 A_d A_p = 1$. When a noise component of 3A terms is $N_I'(n) < -A$, a corresponding symbol is included in a low_part, crossing over a 2A boundary on the constellation. That is, in an ideal case, a condition of $N_I'(n)=0$ should be satisfied, but 3A terms are included in the low_part due to the influence of the noise component $N_I'(n)$.

A third reason is an unequal average power problem. In this case, it will be assumed that no fading phenomenon and no noise component occur.

The unequal average power problem will be described using inner symbols ($\pm A \pm jA$) and outer symbols ($\pm 3A \pm j3A$) on the constellation described in conjunction with FIG. 1.

(1) An unequal average power problem wherein the number of inner symbols within one packet is larger than the number of outer symbols (the number of A terms is larger than the number of 3A terms): When the number of the inner symbols is larger than the number of the outer symbols, since the 3A terms are not included in the low_part, an embodiment of the present invention is not considerably affected.

(2) An unequal average power problem wherein the number of inner symbols within one packet is smaller than the number of outer symbols (the number of A terms is smaller than the number of 3A terms): When the number of the inner symbols is smaller than the number of the outer symbols, since the 3A terms are included in the low_part, the 3A terms included in the low_part function as a noise component. Therefore, the present invention takes statistics on the low part for only the effective length in order to minimize an influence that the 3A terms included in the low_part function as a noise component.

The effective length will now be described herein below.

The effective length is a length (or section) where statistics are taken on a smaller-than-½ number of the symbols within one packet so that excesses of outer symbols occurred due to the unequal average power problem should not be included in the low_part. That is, the effective length is a length where statistics are taken on a length shorter than ½ of a length of symbols within one packet. That is, as illustrated in FIG. 5, a smaller-than-½ number of symbols within one packet are selected as an effective length. However, when the effective length is lengthened, randomness of the statistic process is increased. In contrast, when the effective length is shortened, it is possible to solve the unequal average power problem by removing all excesses of the outer symbols, which vary per packet. Therefore, the effective length should be set to a length that does not lower randomness of the statistic process while removing excesses of the outer symbols. Further, the effective length may comprise a preset length.

Meanwhile, an effective length in the low_part described in conjunction with Equation (19) will be defined as "low_part$_{eff}$." That is, an effective length in the (low_part)$_I$ and an effective length in the (low_part)$_Q$ will be defined as (low_part$_{eff}$)$_I$ and (low_part$_{eff}$)$_Q$, respectively. The power ratio detector 340-1 then takes an average only for the (low_part$_{eff}$)$_I$ and the (low_part$_{eff}$)$_Q$, and divides the result by 2A, as expressed in Equation (20) below.

$$\frac{E\{(\text{low\_part}_{eff})_I\} + E\{(\text{low\_part}_{eff})_Q\}}{2A} = \overline{|\alpha|^2 A_d A_p} \qquad (20)$$

In Equation (20), the reason for dividing the average by 2A is because an I component and a Q component are considered. In addition, the reason is to calculate other terms except A terms from the average. Further, In Equation (20), $E\{(\text{low\_part}_{eff})_I\}$ has a value which is almost similar to a center value of the (low_part)$_I$. Likewise, $E\{(\text{low\_part}_{eff})_Q\}$ has a value which is almost similar to a center value of the (low_part)$_Q$.

The power ratio detector 340-1 can detect a final power ratio between a traffic channel and a pilot channel by dividing the value $\overline{|\alpha|^2(A_d A_p)}$ determined by taking an average only for the (low_part$_{eff}$)$_I$ and the (low_part$_{eff}$)$_Q$ and dividing the average by 2A as shown by Equation (20), by a square of a channel estimation signal $(A_p \alpha e^{-j\theta})^*$ output from the channel estimator 330 in accordance with Equation (21) below.

$$\frac{\overline{|\alpha|^2(A_d A_p)}}{|\alpha|^2 A_p^2} = \frac{\overline{A_d}}{A_p} \qquad (21)$$

The noise component considered in Equation (2) is defined as $$\overline{|\alpha|^2 A_d A_p} = |\alpha|^2 A_d A_p + \frac{E\{N_{A\_term} + N_{3A\_term}\}_I + E\{N_{A\_term} + N_{3A\_term}\}_Q}{2A} \qquad (22)$$

In Equation (22), an error component is $$\frac{E\{N_{A\_term} + N_{3A\_term}\}_I + E\{N_{A\_term} + N_{3A\_term}\}_Q}{2A}.$$

In Equation (22), it can be assumed that $N_{A\_term}$ is a noise component included in an A term, shown in Equation (18), and $N_{3A\_term}$ is a noise component included in a 3A term, shown in Equation (18). In the invention, since a noise component appears as an expectation component not a power component like this, the noise component can be minimized to a value almost approximating to 0.

An internal structure of the power ratio detector 340-1 will now be described with reference to FIG. 4.

Referring to FIG. 4, the power ratio detector 340-1 includes absolute value generators 501 and 503, sorters 505 and 507, integration and dump sections 509 and 511, dividers 513 and 515, an adder 517, a divider 519, a power ratio generator 521, and a squarer 523. As described above, a channel compensation signal $|\alpha|^2 A_d A_p S_d + N'$ output from the channel compensator 320 is applied to the power ratio detector 340-1, and the power ratio detector 340-1 separates the channel compensation signal $|\alpha|^2 A_d A_p S_d + N'$ into a real part, or an I channel component, and an imaginary part, or a Q channel component, and provides the I channel component ($|\alpha|^2 A_d A_p S_{d_I} + N_I'$) to the absolute value generator 501 and the Q channel component $j(|\alpha|^2 A_d A_p S_{d_Q} + N_Q')$ to the absolute value generator 503. Then, the absolute value generator 501 generates an absolute value of the I channel component ($|\alpha|^2 A_d A_p S_{d_I} + N_I'$) and outputs the generated absolute value to the sorter 505. Likewise, the absolute value generator 503 generates an absolute value of the Q channel component $j(|\alpha|^2 A_d A_p S_{d_Q} + N_Q')$ and outputs the generated absolute value to the sorter 507.

The sorter 505 receives absolute values $$|(|\alpha(n)|^2 A_d A_p) \cdot A + N'_I(n)| + |(|\alpha(n)|^2 A_d A_p) \cdot 3A + N'_I(n)|$$

of the I channel component, output from the absolute value generator 501, continuously sorts the absolute values from a minimum value to a maximum value according to their magnitude, and then provides the sorted absolute values to the integration and dump section 509. Similarly, the sorter 507 receives absolute values $$|(|\alpha(n)|^2 A_d A_p) \cdot A + N'_Q(n)| + |(|\alpha(n)|^2 A_d A_p) \cdot 3A + N'_Q(n)|$$

of the Q channel component, output from the absolute value generator 503, continuously sorts the absolute values from a minimum value to a maximum value, and then provides the sorted absolute values to the integration and dump section 511.

The integration and dump section 509 classifies the values determined by sorting the absolute values output from the sorter 505, i.e., absolute values of the I channel component, from a minimum value to a maximum value according to their magnitudes, into (low_part)$_I$ and (high_part)$_I$, considers only the (low_part)$_I$, takes an effective length (low_part$_{eff}$)$_I$ having a preset length in the (low_part)$_I$, performs integration and dump on the effective length (low_part$_{eff}$)$_I$, and then provides the integration and dump result to the divider 513. The integration and dump section 511 classifies the values determined by sorting the absolute values output from the sorter 507, i.e., absolute values of the Q channel component, from a minimum value to a maximum value according to their magnitudes, into (low_part)$_Q$ and (high_part)$_Q$, considers only the (low_part)$_Q$, takes an effective length (low_part$_{eff}$)$_Q$ having a preset length in the (low_part)$_Q$, performs integration and dump on the effective length (low_part$_{eff}$)$_Q$, and then provides the integration and dump result to the divider 515. The divider 513 divides a value output from the integration and dump section 509 by the length N of the effective length and provides the division result to the adder 517. The divider 515 divides a value output from the integration and dump section 511 by the length N of the effective length and provides the division result to the adder 517. The adder 517 generates average power, $E\{(low\_part_{eff})_I\}+E\{(low\_part_{eff})_Q\}$, of the effective length for which both the I channel component and the Q channel component were considered, by adding an output value of the divider 513 to an output value of the divider 515, and provides the generated average power to the divider 519.

The divider 519 calculates a ½ value of the average value. To do so the divider 519 divides the average power $E\{(low\_part_{eff})_I\}+E\{(low\_part_{eff})_Q\}$ of the effective length, output from the adder 517, by 2A, and then provides the division result to the power ratio generator 521. The divider 519 divides the average power $E\{(low\_part_{eff})_I\}+E\{(low\_part_{eff})_Q\}$ of the effective length, output from the adder 517, by 2A because the I component and the Q component are considered as mentioned above. In addition, the reason is to calculate other terms except the A terms from the average power of the effective length. The squarer 523 takes an absolute value of a channel estimation signal $(A_p \alpha e^{-j\theta})^*$ output from the channel estimator 330, squares the absolute value, and outputs the squared absolute value to the power ratio generator 521.

The power ratio generator 521 receives a signal, $\overline{|\alpha|^2(A_d A_p)}$, output from the divider 519 and a signal, $|\alpha|^2 A_p^2$, output from the squarer 523, and finally detects a power ratio, $$\frac{A_d}{A_p},$$

between a traffic channel and a pilot channel by dividing the $\overline{|\alpha|^2(A_d A_p)}$ by the $|\alpha|^2 A_p^2$.

As a result, the traffic-versus-pilot channel power ratio $$\frac{A_d}{A_p}$$

detected by the power ratio detector 340-1 is equal to the power ratio value detected by the traffic channel accumulation averaging technique which is the general blind power ratio detection technique described in the related art section. However, the invention is superior in terms of accuracy since only the effective length is considered in detecting the traffic-versus-pilot channel power ratio. This will be described in detail herein below.

(1) Minimization of Fading Effect

As described above, an output of the conventional power ratio detector 340-1 according to the traffic channel accumulation averaging technique is $$\frac{\sqrt{|\alpha|^4 (A_d A_p)^2 <S_d> + <N'>}}{|\alpha|^2 A_p^2} = \sqrt{\left(\frac{A_d}{A_p}\right)^2 + \text{error}}$$

(where an error component is $$\Delta <S_d> \cdot \left(\frac{A_d}{A_p}\right)^2 + \frac{<N'>}{|\alpha|^4 A_p^4},$$

see Equation (12)), and an output of the new power ratio detector 340-1 according to the present invention is $$\overline{|\alpha^2|A_d A_p} = |\alpha^2|A_d A_p + \frac{E\{N_{A\_term} + N_{3A\_term}\}_I + E\{N_{A\_term} + N_{3A\_term}\}_Q}{2A}$$

(see Equation (22)). In the case of Equation (12), since the output signal of the power ratio detector 340-1 includes a noise power component <N'> and the noise power component always has a positive value, a term of $$\frac{\sqrt{<N'>}}{|\alpha|^2 A_p^2}$$

directly delivers the effect of a fading phenomenon. However, in the case of Equation (22) according to the present invention, the output signal of the power ratio detector 340-1 does not suffer from the fading effect. Therefore, the invention contributes to an improvement in blind power ratio detection performance in a fast fading channel.

(2) Minimization of Noise Component

As described above, in the blind power ratio detection technique based on the traffic channel accumulation averaging technique, a noise power component is included in the accumulated average power as described in conjunction with Equation (8), so a positive noise component is always included in a statistic for blind power ratio detection. Therefore, unless a procedure for separately removing the noise power component is performed, as the noise component is increased, an error of a statistic for the blind power ratio detection is also increased. However, in the blind power ratio detection technique of the invention, since an average value of the noise component is included in a statistic as descried in conjunction with Equation (18), if it is assumed that the average value of the noise component almost approximates to 0, there is very low probability that the noise component will function as an error of the statistic for the blind power ratio detection. Further, in an embodiment of the invention, the blind power ratio detection is performed using only low_part, and since every peak noise component is included in high_part, there is very low probability that a noise component of the statistic will function as an error.

(3) Solution of Unequal Average Power Problem

The blind power ratio detection technique of the invention solves the unequal average power problem by continuously sorting absolute values of an I channel component and absolute values of a Q channel component from a minimum value to a maximum value according to their magnitudes, classifying the sorted absolute values into low_part and high_part, selecting only the low_part, and selecting only an effective length in order to minimize an influence due to unequal average power even in the low_part.

Figure 6:
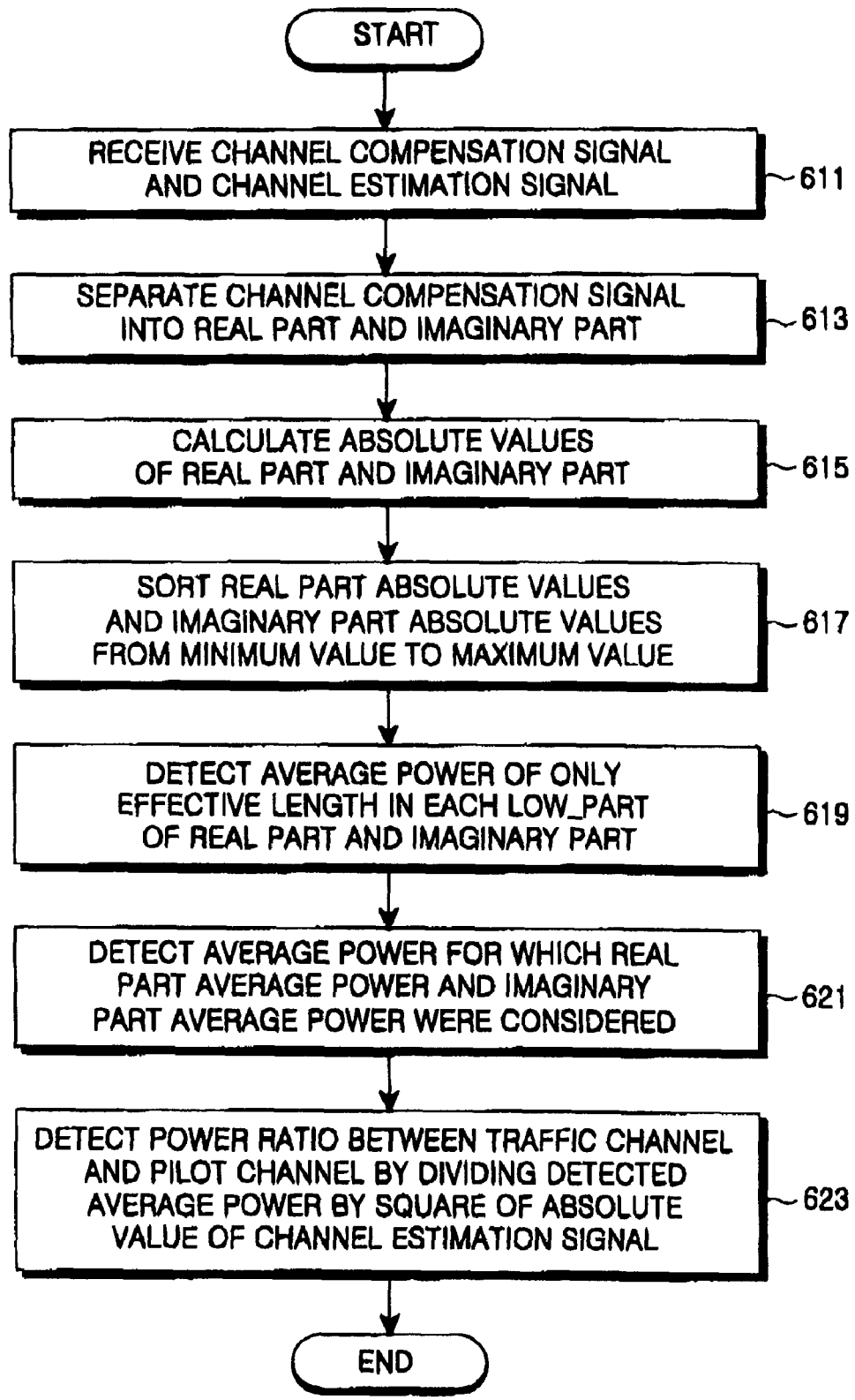
FIG. 6 is a flowchart illustrating an example of a procedure for detecting a power ratio between a traffic channel and a pilot channel according to an embodiment of the present invention.

With reference to FIG. 6, a description will now be made of a procedure for detecting a power ratio between a traffic channel and a pilot channel according to an embodiment of the present invention.

FIG. 6 is a flowchart illustrating an example of a procedure for detecting a power ratio between a traffic channel and a pilot channel according to an embodiment of the present invention. Referring to FIG. 6, in step 611, the power ratio detector 340-1 receives a channel compensation signal $|\alpha|^2 A_d A_p S_d + N'$ output from the channel compensator 320 and a channel estimation signal $(A_p \alpha e^{-j\theta})^*$ output from the channel estimator 330, and then proceeds to step 613. In step 613, the power ratio detector 340-1 separates the channel compensation signal $|\alpha|^2 A_d A_p S_d + N'$ into a real part, or I channel component, and an imaginary part, or Q channel component, and then proceeds to step 615. In step 615, the power ratio detector 340-1 takes absolute values of the separated I channel component $(|\alpha|^2 A_d A_p S_{d_I} + N_I')$ and the separated Q channel component $j(|\alpha|^2 A_d A_p S_{d_Q} + N_Q')$, and then proceeds to step 617. In step 617, the power ratio detector 340-1 receives absolute values $$|(|\alpha(n)|^2 A_d A_p) \cdot A + N_I'(n)| + |(|\alpha(n)|^2 A_d A_p) \cdot 3A + N_I'(n)|$$

of the I channel component and absolute values $$|(|\alpha(n)|^2 A_d A_p) \cdot A + N_Q'(n)| + |(|\alpha(n)|^2 A_d A_p) \cdot 3A + N_Q'(n)|$$

of the Q channel component, continuously sorts the absolute values from a minimum value to a maximum value according to their magnitudes, and then proceeds to step 619.

In step 619, the power ratio detector 340-1 classifies the sorted absolute values of the I channel component and the sorted absolute values of the Q channel component into low_part and high_part, considers only an effective length, detects average power of the effective length, and then proceeds to step 621. In step 621, the power ratio detector 340-1 adds average power of an effective length of the I channel component and average power of an effective length of the Q channel component thereby to detect again average power of an effective length for which both the I channel component and the Q channel component were considered, and then proceeds to step 623. In step 623, the power ratio detector 340-1 finally detects a traffic-versus-pilot channel power ratio $$\frac{A_d}{A_p}$$

by dividing average power of the effective length for which both the I channel component and the Q channel component were considered, by a value determined by squaring an absolute value of the channel estimation signal $(A_p \alpha e^{-j\theta})^*$ output from the channel estimator 330, and then ends the procedure.

Next, with reference to FIG. 7, a description will be made of a structure of a power ratio detection apparatus for detecting a power ratio between a traffic channel and a pilot channel according to another embodiment of the present invention.

Figure 7:
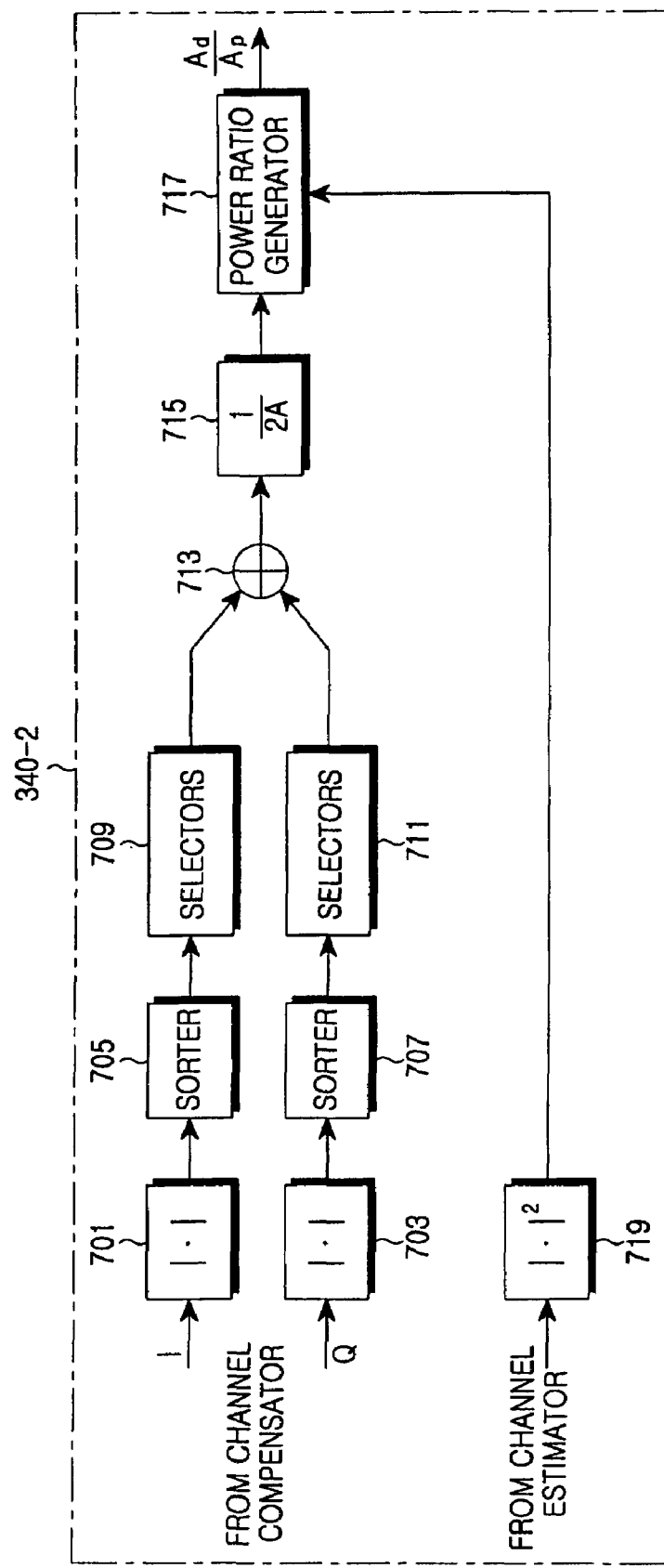
FIG. 7 is a block diagram illustrating an example of an internal structure of a power ratio detection apparatus for detecting a power ratio between a traffic channel and a pilot channel according to an embodiment of the present invention.

FIG. 7 is a block diagram illustrating an example of an internal structure of a power ratio detection apparatus for detecting a power ratio between a traffic channel and a pilot channel according to an embodiment of the present invention.

It should be noted that the present invention applies the same receiver structure as the general receiver structure described in conjunction with FIG. 3 except that a structure of the power ratio detector 340 according to an embodiment of the present invention enables efficient power ratio detection. Therefore, it should be noted that input/output signals of the despreader 310, the channel compensator 320 and the channel estimator 330 are equal to the input/output signals described in the related art section. Although a blind power ratio detector of the invention is assigned the same reference numeral as that of the power ratio detector 340 described in the related art section for the convenience of explanation, they operate in different ways. The power ratio detector 340-2 of FIG. 7 includes absolute value generators 701 and 703, sorters 705 and 707, selectors 709 and 711, an adder 713, a divider 715, a power ratio generator 717, and a squarer 719.

The absolute value generators 701 and 703, and the sorters 705 and 707 are identical in operation to the absolute value generators 501 and 503, and the sorters 505 and 507 described in conjunction with FIG. 4, so a detailed description thereof will be omitted for purposes of simplicity. The selector 709 classifies the values obtained by sorting absolute values of the I channel component, output from the sorter 705, from a minimum value to a maximum value according to their magnitudes into (low_part)$_I$ and (high_part)$_I$, considers only the (low_part)$_I$, selects a center value of the (low_part)$_I$ as average power of the effective length, and provides the selected average power to the adder 713. The reason for selecting average power of the effective length (low_part$_{eff}$)$_I$ as a center value of the (low_part)$_I$ is because E{(low_part$_{eff}$)$_I$} has a value almost approximating to the center value of the (low_part)$_I$, as described in conjunction with Equation (20). That is, since average power of a particular length (low_part$_{eff}$)$_I$ can be approximated to a center value of a corresponding particular length, the average power can be simplified as $$E\{\text{low\_part}_{eff}\} \approx \text{center\_of\_low\_part} \tag{23}$$

In Equation (23), since the low_part includes the values obtained by classifying from a minimum value the values previously sequentially sorted from a minimum value to a maximum value, if it is considered that a zero-mean noise component is added to A terms, the center value of the low_part is equal to an average value of the low_part$_{eff}$. In addition, the selector 711 classifies the values obtained by sorting absolute values of the Q channel component, output from the sorter 707, from a minimum value to a maximum value according to their magnitudes into (low_part)$_Q$ and (high_part)$_Q$, considers only the (low_part)$_Q$, selects a center value of the (low_part)$_Q$ as average power of the effective length, and provides the selected average power to the adder 713. The reason for selecting average power of the effective length (low_part$_{eff}$)$_Q$ as a center value of the (low_part)$_Q$ is also because E{(low_part$_{eff}$)$_Q$} has a value almost approximating to the center value of the (low_part)$_Q$, as described in conjunction with Equation (20). Thereafter, the adder 713 adds a value, center_of_part$_I$, output from the selector 709 and a value, center_of_part$_q$, output from the selector 711, and provides the addition result to the divider 715. Also, the divider 715, the power ratio generator 717, and the squarer 719 operate in the same way as described in conjunction with FIG. 4, so a detailed description thereof will be omitted for purposes of simplicity.

Meanwhile, the foregoing description has been made on the assumption that a transmitter uses a single channelization code when transmitting a packet over the traffic channel. When the transmitter uses multiple channelization codes when transmitting a packet over the traffic channel, since each of the channelization codes can be used in transmitting one packet, it is possible to simultaneously transmit a plurality of different packets. Therefore, data channel signals received by a receiver become the signals that have the same power ratio between the data channels and have passed the same path. However, since an unequal average power problem may occur between the data channels, it is possible to further improve the accuracy by averaging the traffic-versus-pilot channel power ratio detected for each data channel. In contrast, when hardware complexity is considered, it is also possible to use the traffic-versus-pilot channel power ratio detected in a particular channel for all the other data channels, instead of averaging the traffic-versus-pilot channel power ratio detected for each data channel.

Next, with reference to FIG. 8, a description will be made of a power ratio detection apparatus for detecting a power ratio between a traffic channel and a pilot channel according to further another embodiment of the present invention.

Figure 8:
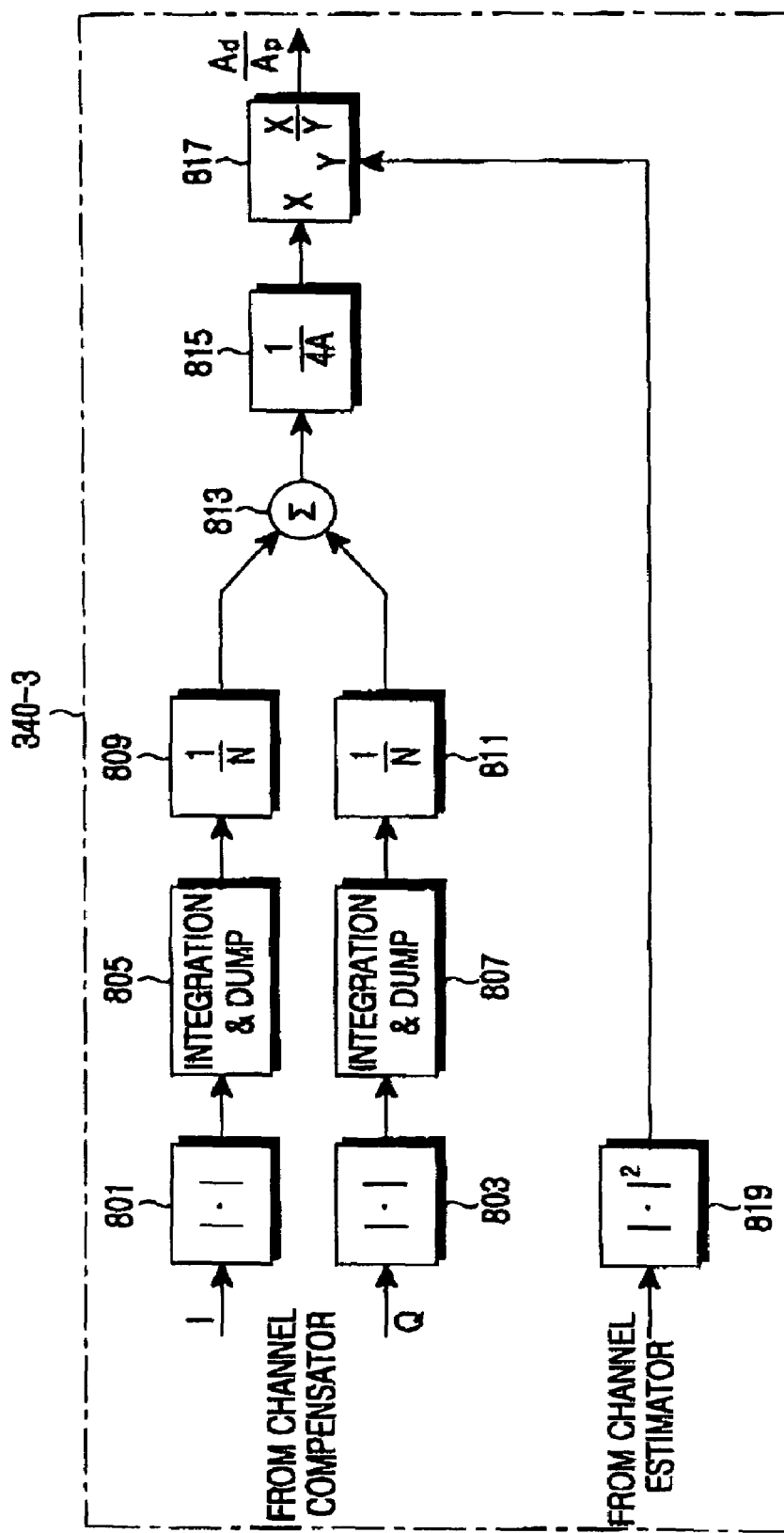
FIG. 8 is a block diagram illustrating another example of an internal structure of a power ratio detection apparatus for detecting a power ratio between a traffic channel and a pilot channel according to an embodiment of the present invention.

FIG. 8 is a block diagram illustrating another example of an internal structure of a power ratio detection apparatus for detecting a power ratio between a traffic channel and a pilot channel according to an embodiment of the present invention. Referring to FIG. 8, the power ratio detector 340-3 includes absolute value generators 801 and 803, integration and dump sections 805 and 807, dividers 809 and 811, an adder 813, a divider 815, a power ratio generator 817, and a squarer 819. As mentioned above, a channel compensation signal $|\alpha|^2 A_d A_p S_d + N'$ output from the channel compensator 320 is applied to the power ratio detector 340-3, and the power ratio detector 340-3 separates the channel compensation signal $|\alpha|^2 A_d A_p S_d + N'$ into a real part, or I channel component, and an imaginary part, or Q channel component, and provides the I channel component ($|\alpha|^2 A_d A_p S_{d_I} + N_I'$) to the absolute value generator 801 and the Q channel component j($|\alpha|^2 A_d A_p S_{d_Q} + N_Q'$) to the absolute value generator 803. The absolute value generator 801 then generates an absolute value of the I channel component ($|\alpha|^2 A_d A_p S_{d_I} + N_I'$) and outputs the generated absolute value to the integration and dump section 805. Similarly, the absolute value generator 803 generates an absolute value of the Q channel component j($|\alpha|^2 A_d A_p S_{d_Q} + N_Q'$) and outputs the generated absolute value to the integration and dump section 807. Herein, the absolute value generators 801 and 803 generate the absolute values by the frame, i.e., by the N symbols.

The integration and dump section 805 performs integration and dump on absolute values $$|(|\alpha(n)|^2 A_d A_p) \cdot A + N_I'(n)| + |(|\alpha(n)|^2 A_d A_p) \cdot 3A + N_I'(n)|$$

of the I channel component, output from the absolute value generator 801, and provides its output to the divider 809. Similarly, the integration and dump section 807 performs integration and dump on absolute values $$|(|\alpha(n)|^2 A_d A_p) \cdot A + N_Q'(n)| + |(|\alpha(n)|^2 A_d A_p) \cdot 3A + N_Q'(n)|$$

of the Q channel component, output from the absolute value generator 803, and provides its output to the divider 811. The divider 809 divides a signal output from the integration and dump section 805 by the number N of symbols constituting the frame, and provides the division result to the adder 813. The divider 811 divides a signal output from the integration and dump section 807 by the number N of symbols constituting the frame, and provides the division result to the adder 813. Here, the reason why the dividers 809 and 811 divide the signals output from the integration and dump sections 805 and 807 by the N is to calculate average power in the frame section.

Meanwhile, since $|S_{d_I}|, |S_{d_Q}| \in \{A, 3A\}$ as stated above, when there is no noise, |I| and |Q| are always positive numbers. The |I| and |Q| are expressed as $$|I| = |Q| = (|\alpha|^2 A_d A_p A) + (|\alpha|^2 A_d A_p 3A) \qquad (24)$$
$$\text{mean } (|I|) = \text{mean } (|Q|) = |\alpha|^2 A_d A_p 2A$$

When there is no noise as shown in Equation (24), an average value of respective absolute values of the real part and the imaginary part is represented by a 2A term. Therefore, a ½ value of the average value, i.e., mean/2, has an effect of sorting described above. The mean/2 is expressed as $$\frac{\text{mean } (|I|) + \text{mean } (|Q|)}{4A} = |\alpha|^2 A_d A_p \qquad (25)$$

Meanwhile, the adder 813 adds a signal output from the divider 809 and a signal output from the divider 811, and provides the addition result to the divider 815. The divider 815 divides a signal output from the adder 813 by $$\frac{1}{4A}$$

in order to calculate the mean/2, and provides the division result to the power ratio generator 817. The squarer 819 takes an absolute value of a channel estimation signal $(A_p \alpha e^{-j\theta})^*$ output from the channel estimator 330, squares the absolute value, and then provides the squared absolute value to the power ratio generator 817.

The power ratio generator 817 receives a signal $|\alpha|^2 A_d A_p$ output from the divider 815 and a signal $|\alpha|^2 A_p^2$ output from the squarer 819, and finally detects a traffic-versus-pilot channel power ratio $$\frac{A_d}{A_p}$$

by dividing the $|\alpha|^2 A_d A_p$ by the $|\alpha|^2 A_p^2$. Such traffic-versus-pilot channel power ratio detection using mean/2 of the channel compensated signal enables traffic-versus-pilot channel power ratio detection with minimized complexity.

Next, with reference to FIG. 9, a description will be made of a procedure for detecting a power ratio between a traffic channel and a pilot channel in the power ratio detection apparatus of FIG. 8.

Figure 9:
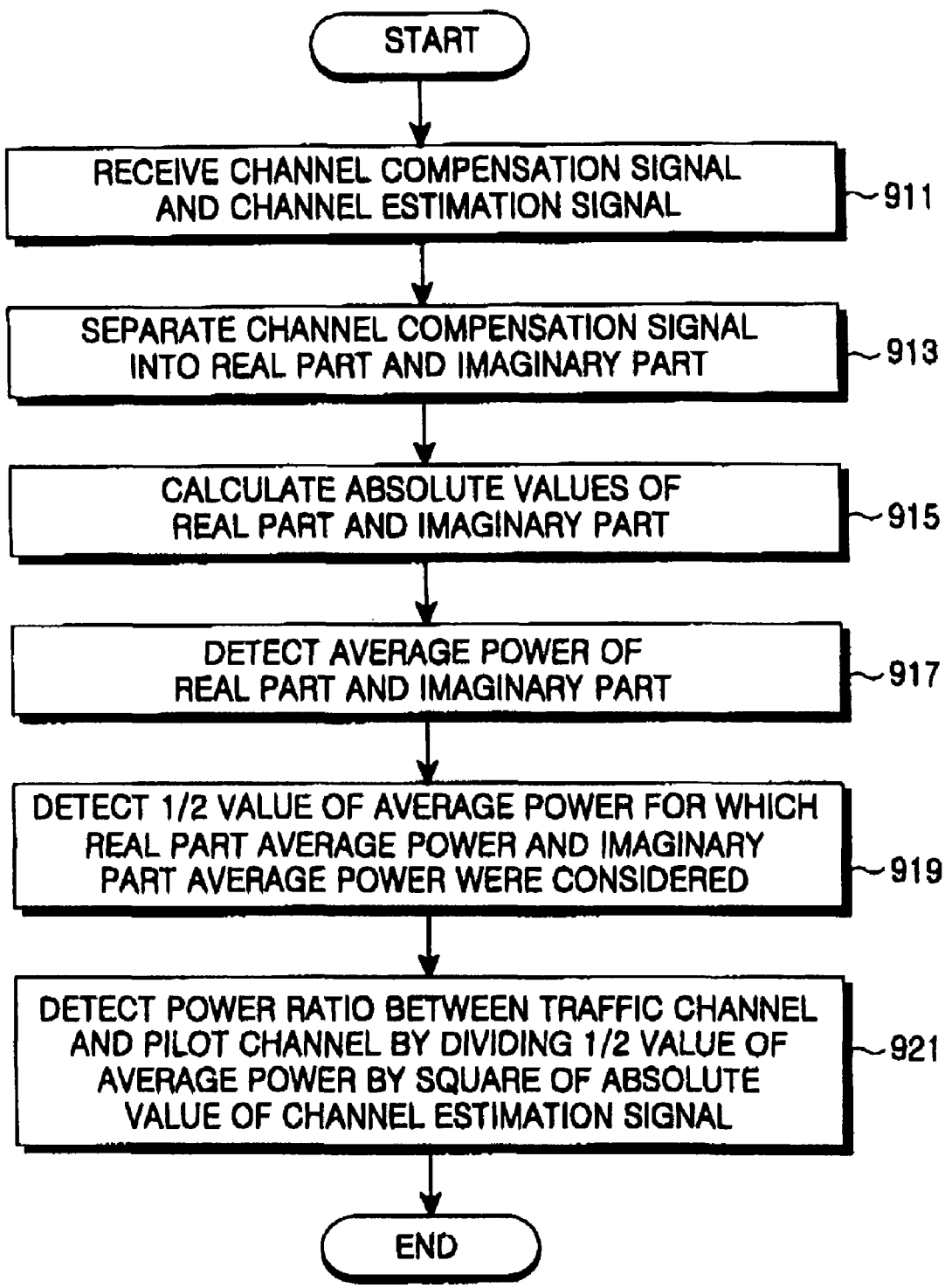
FIG. 9 is a flowchart illustrating an example of a procedure for detecting a power ratio between a traffic channel and a pilot channel according to an embodiment of the present invention.

FIG. 9 is a flowchart illustrating an example of a procedure for detecting a power ratio between a traffic channel and a pilot channel according to an embodiment of the present invention. Referring to FIG. 9, in step 911, the power ratio detector 340-2 receives a channel compensation signal $|\alpha|^2 A_d A_p S_d + N'$ output from the channel compensator 320 and a channel estimation signal $(A_p \alpha e^{-j\theta})^*$ output from the channel estimator 330, and then proceeds to step 913. In step 913, the power ratio detector 340-2 separates the channel compensation signal $|\alpha|^2 A_d A_p S_d + N'$ into a real part, or I channel component, and an imaginary part, or Q channel component, and then proceeds to step 915. In step 915, the power ratio detector 340-2 takes absolute values of the separated I channel component $(|\alpha|^2 A_d A_p S_{d_I} + N_I')$ and the separated Q channel component $j(|\alpha|^2 A_d A_p S_{d_Q} + N_Q')$, and then proceeds to step 917. In step 917, the power ratio detector 340-2 receives absolute values $$\left| (|\alpha(n)|^2 A_d A_p) \cdot A + N_I'(n) \right| + \left| (|\alpha(n)|^2 A_d A_p) \cdot 3A + N_I'(n) \right|$$

of the I channel component and absolute values $$\left| (|\alpha(n)|^2 A_d A_p) \cdot A + N_Q'(n) \right| + \left| (|\alpha(n)|^2 A_d A_p) \cdot 3A + N_Q'(n) \right|$$

of the Q channel component, detects average power of the I channel component and average power of the Q channel component, and then proceeds to step 919.

In step 919, the power ratio detector 340-2 detects a ½ value of average power for which the average power of the real part, or I channel component, and the average power of the imaginary part, or Q channel component, were considered, and then proceeds to step 921. Here, the reason for detecting a ½ value of the average power is because the ½ value of the average power is represented by A term, as mentioned above. In step 921, the power ratio detector 340-2 finally detects a traffic-versus-pilot channel power ratio $$\frac{A_d}{A_p}$$

by dividing the ½ value of the average power by a value determined by squaring an absolute value of the channel estimation signal $(A_p \alpha e^{-j\theta})^*$ output from the channel estimator 330, and then ends the procedure.

Next, with reference to FIG. 10, a description will be made of a procedure for detecting a power ratio between a traffic channel and a pilot channel in the power ratio detection apparatus of FIG. 7.

Figure 10:
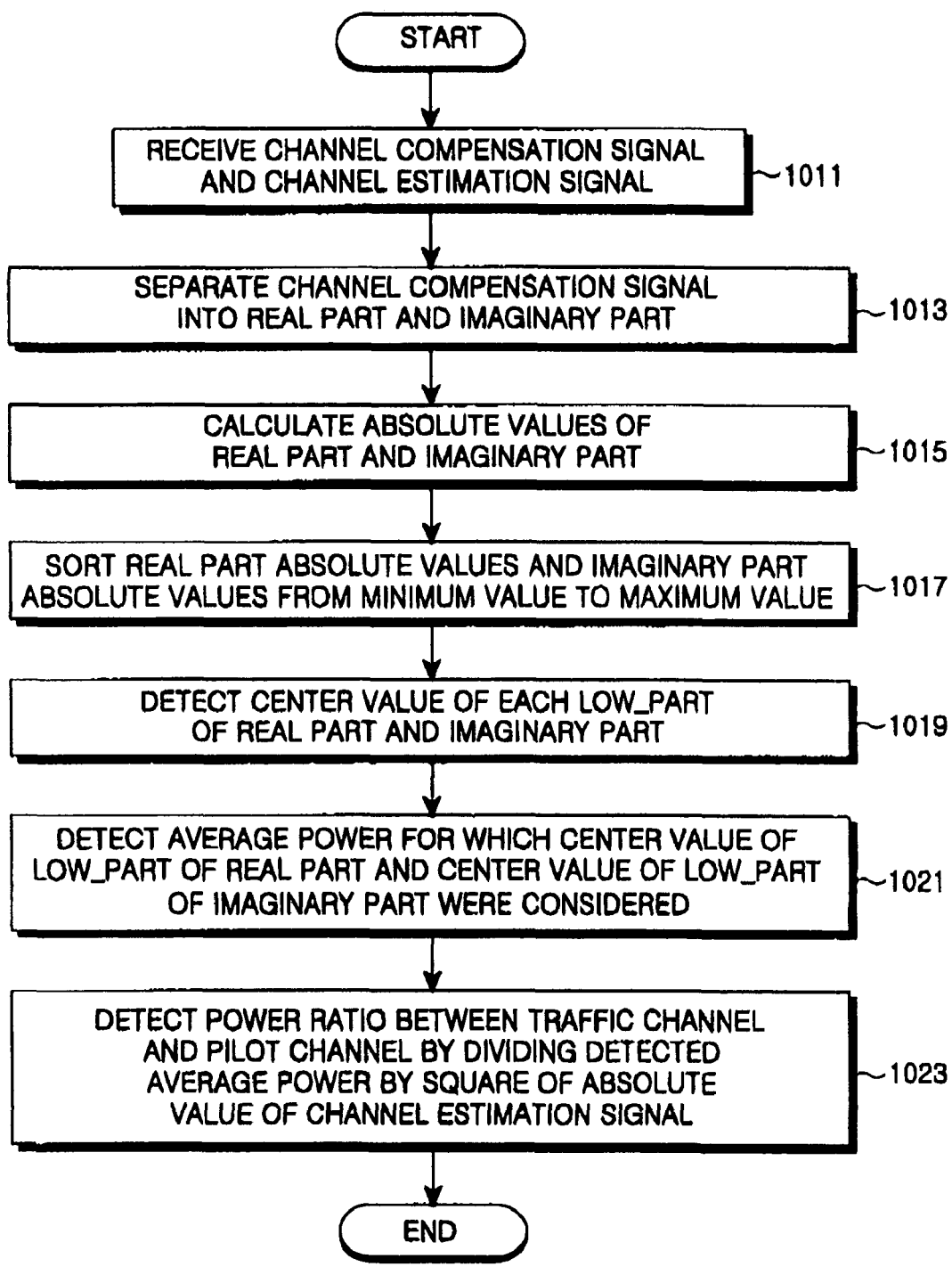
FIG. 10 is a flowchart illustrating another example of a procedure for detecting a power ratio between a traffic channel and a pilot channel according to an embodiment of the present invention.

FIG. 10 is a flowchart illustrating another example of a procedure for detecting a power ratio between a traffic channel and a pilot channel according to an embodiment of the present invention. Referring to FIG. 10, in step 1011, the power ratio detector 340-3 receives a channel compensation signal $|\alpha|^2 A_d A_p S_d + N'$ output from the channel compensator 320 and a channel estimation signal $(A_p \alpha e^{-j\theta})^*$ output from the channel estimator 330, and then proceeds to step 1013. In step 1013, the power ratio detector 340-3 separates the channel compensation signal $|\alpha|^2 A_d A_p S_d + N'$ into a real part, or I channel component, and an imaginary part, or Q channel component, and then proceeds to step 1015. In step 1015, the power ratio detector 340-3 takes absolute values of the separated I channel component $(|\alpha|^2 A_d A_p S_{d_I} + N_I')$ and the separated Q channel component $j(|\alpha|^2 A_d A_p S_{d_Q} + N_Q')$, and then proceeds to step 1017. In step 1017, the power ratio detector 340-3 receives absolute values $$\left| (|\alpha(n)|^2 A_d A_p) \cdot A + N_I'(n) \right| + \left| (|\alpha(n)|^2 A_d A_p) \cdot 3A + N_I'(n) \right|$$

of the I channel component and absolute values $$\left|\left(|\alpha(n)|^2 A_d A_p\right) \cdot A + N'_Q(n)\right| + \left|\left(|\alpha(n)|^2 A_d A_p\right) \cdot 3A + N'_Q(n)\right|$$

of the Q channel component, continuously sorts the absolute values from a minimum value to a maximum value according to their magnitudes, and then proceeds to step 1019.

In step 1019, the power ratio detector 340-3 classifies the sorted absolute values of the I channel component and the sorted absolute values of the Q channel component into low_part and high_part, detects a center value of the low_part, and then proceeds to step 1021. In step 1021, the power ratio detector 340-3 adds a center value of the low_part of the I channel component and a center value of the low_part of the Q channel component, detects again average power for which the I channel component and the Q channel component were both considered, and then proceeds to step 1023. In step 1023, the power ratio detector 340-3 finally detects a traffic-versus-pilot channel power ratio $$\frac{\overline{A_d}}{A_p}$$

by dividing the average power for which the I channel component and the Q channel component were both considered, by a value determined by squaring an absolute value of the channel estimation signal $(A_p \alpha e^{-j\theta})^*$ output from the channel estimator 330, and then ends the procedure.

Next, with reference to FIG. 11, a description will be made of a frame error rate according to embodiments of the present invention.

Figure 11:
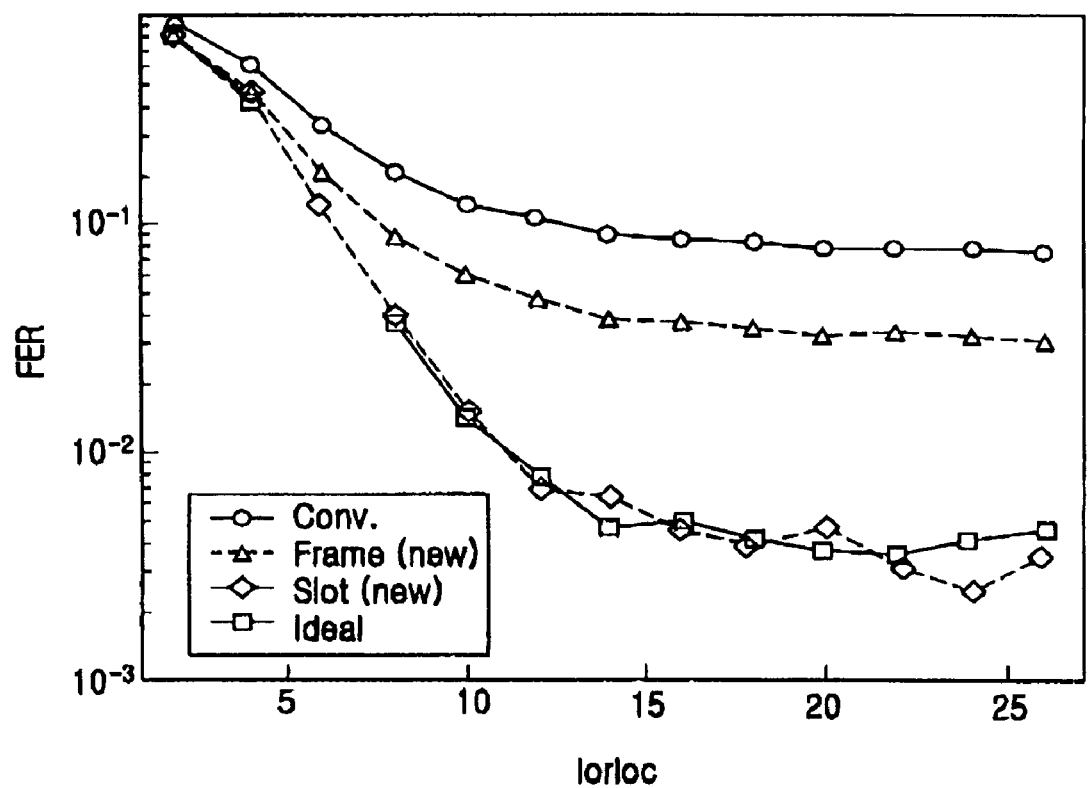
FIG. 11 is a graph illustrating an example of a frame error rate when the traffic-versus-pilot channel power ratio detection method is employed according to an embodiment of the present invention.

FIG. 11 is a graph illustrating an example of a frame error rate when the traffic-versus-pilot channel power ratio detection method is employed according to an embodiment of the present invention is applied. Referring to FIG. 11, a vertical axis represents a frame error rate (hereinafter referred to as "FER"), and a horizontal axis represents Ior/Ioc. In the Ior/Ioc, Ior represents total transmission power, and Ioc represents total reception power including interference power and noise power. As a result, the Ior/Ioc has the almost same meaning as a signal-to-noise ratio (SNR). FIG. 11 shows FER when a radio channel environment has one data channel, i.e., traffic channel, a 120 Km fading channel and 4 multi-paths, 16QAM is used as a modulation scheme, and a coding rate of a turbo coder is ¾.

As illustrated in FIG. 11, an FER characteristic curve given when the blind power ratio detection technique of the invention was performed by the time slot is almost similar to an FER characteristic curve in an ideal environment. In addition, an FER characteristic curve given when blind power ratio detection was performed in the traffic channel accumulation averaging technique which is the conventional blind power ratio detection technique shows the worst FER characteristic curve. An FER characteristic curve given when the new blind power ratio detection technique of the invention was performed by the frame, i.e., by the packet, is inferior to an FER characteristic curve given when the new blind power ratio detection technique was performed by the time slot, but is much superior to an FER characteristic curve given when the blind power ratio detection was performed in the traffic channel accumulation averaging technique. The FER characteristic curve becomes different according to the change in the blind power ratio detection unit because since a variation in output of the channel estimator 330 is great in a fast fading environment, it is more accurate to output an average value of a short length to the power ratio generators 521 and 717, rather than outputting an average value of a long length to the power ratio generators 521 and 717. That is, in an HSDPA communication system, since 3 time slots constitute one frame, the time slot-based blind power ratio detection is three times higher than the frame-based blind power ratio detection in detection frequency, and since a more accurate output value of the channel estimator 330 can be used for blind power ratio detection, the result becomes accurate, showing a better FER characteristic.

Meanwhile, the blind power ratio detection technique of the invention has been described with reference to a case where a 16QAM modulation scheme is applied to an HSDPA communication system. However, in a high-order modulation scheme, for example, 64QAM, since its amplitude has 4 values such as $|S_{d_I}|, |S_{d_Q}| \in \{A, 3A, 5A, 7A\}$, the values are sorted in a similar method as the 16QAM and then divided into four equal parts, and a power ratio is determined from A term which is the lowest part of them. The other processes are also applied in the same way as the 16QAM.

As described above, the invention sets up an effective length according to an absolute value of each of symbols constituting a channel compensation signal, and then detects a power ratio between a traffic channel and a pilot channel by detecting average power for only the effective length. Therefore, the new blind power ratio detection technique of the invention, like the conventional blind power ratio detection technique, especially the blind power ratio detection based on the accumulation averaging technique, removes a blind power ratio detection error due to power of a noise mixed in a received signal. In addition, the new blind power ratio detection technique eliminates a blind power ratio detection error caused by an unequal average power problem by calculating average power considering only the effective length, and also removes the blind power ratio detection error due to the unequal average power problem by removing the influence of a fading phenomenon, thus contributing to performance improvement. As a result, the new blind power ratio detection technique minimizes a frame error rate, thereby maximizing the overall transmission throughput of the system.

While the invention has been shown and described with reference to certain embodiments thereof, it will be understood by those skilled in the art that various changes in form and details may be made therein without departing from the spirit and scope of the invention as defined by the appended claims.

What is claimed is:

1. An apparatus for detecting a power ratio between a first channel and a second channel in a mobile communication system, comprising:
   a channel estimator for generating a first signal by performing channel estimation using a first channel signal;
   a channel compensator for generating a second signal by channel-compensating a second channel signal using the first signal; and
   a power ratio detector for generating absolute values of symbols constituting the second signal, selecting absolute values in a predetermined length after sorting the absolute values in magnitude order, calculating an average value of the selected absolute values, calculating a square of an absolute value of the first signal, and generating the power ratio using a ratio of the average value to the square of the absolute value of the first signal.

2. The apparatus of claim 1, wherein the power ratio detector comprises:
an absolute value generator for the receiving symbols constituting the second signal and generating an absolute value of each of the symbols;
a sorter for sorting the absolute values generated by the absolute value generator in magnitude order;
an average value calculator for selecting the absolute values in a predetermined length among the sorted absolute values, and calculating the average value of the selected absolute values;
a squarer for calculating the square of the absolute value of the first signal; and
a power ratio generator for generating the power ratio by a ratio of the average value to the square of the absolute value of the first signal.

3. The apparatus of claim 1, wherein the predetermined length is a length determined by separating the sorted absolute values into a predetermined number of lengths centering on a preset reference point, selecting a length including a minimum value of the absolute values among the predetermined number of lengths, and selecting a preset length from the selected length.

4. The apparatus of claim 3, wherein the reference point is determined according to a modulation scheme of the second channel.

5. The apparatus of claim 3, wherein the preset length includes absolute values determined by excluding a preset number of absolute values among absolute values existing in the selected length in descending order from a maximum value and a preset number of absolute values among the absolute values existing in the selected length in ascending order from a minimum value.

6. An apparatus for detecting a power ratio between a first channel and a second channel in a mobile communication system, comprising:
an absolute value generator for receiving symbols constituting a first signal generated by channel-compensating a first channel signal;
a sorter for sorting the absolute values generated by the absolute value generator in magnitude order;
an average calculator for selecting the absolute values in a predetermined length among the sorted absolute values, and calculating an average value of the selected absolute values;
a squarer for calculating a square of an absolute value of a second signal generated by performing channel estimation using a second channel signal; and
a power ratio generator for generating the power ratio by a ratio of the average value to the square of the absolute value of the second signal.

7. The apparatus of claim 6, wherein the predetermined length is a length determined by separating the sorted absolute values into a predetermined number of lengths centering on a preset reference point, selecting a length including a minimum value of the absolute values among the predetermined number of lengths, and selecting a preset length from the selected length.

8. The apparatus of claim 7, wherein the reference point is determined according to a modulation scheme of the first channel.

9. The apparatus of claim 7, wherein the preset length includes absolute values determined by excluding a preset number of absolute values among absolute values existing in the selected length in descending order from a maximum value and a preset number of absolute values among the absolute values existing in the selected length in ascending order from a minimum value.

10. An apparatus for detecting a power ratio between a first channel and a second channel in a mobile communication system, comprising:
a channel estimator for generating a first signal by performing channel estimation using a first channel signal;
a channel compensator for generating a second signal by channel-compensating a second channel signal using the first signal; and
a power ratio detector for generating absolute values of symbols constituting the second signal, selecting absolute values in a predetermined length after sorting the absolute values in magnitude order, detecting a center value of the predetermined length, calculating a square of an absolute value of the first signal, and generating the power ratio using a ratio of the center value to the square of the absolute value of the first signal.

11. The apparatus of claim 10, wherein the power ratio detector comprises:
an absolute value generator for receiving the symbols constituting the second signal, and generating an absolute value of each of the symbols;
a sorter for sorting the absolute values generated by the absolute value generator in magnitude order;
a selector for selecting the absolute values in a predetermined length among the sorted absolute values, and selecting the center value of the predetermined length;
a squarer for calculating a square of an absolute value of the first signal; and
a power ratio generator for generating the power ratio by a ratio of the center value to the square of the absolute value of the first signal.

12. The apparatus of claim 10, wherein the predetermined length is a length determined by separating the sorted absolute values into a predetermined number of lengths centering on a preset reference point, selecting a length including a minimum value of the absolute values among the predetermined number of lengths, and selecting a preset length from the selected length.

13. The apparatus of claim 12, wherein the reference point is determined according to a modulation scheme of the second channel.

14. The apparatus of claim 12, wherein the preset length includes absolute values determined by excluding a preset number of absolute values among absolute values existing in the selected length in descending order from a maximum value and a preset number of absolute values among the absolute values existing in the selected length in ascending order from a minimum value.

15. An apparatus for detecting a power ratio between a first channel and a second channel in a mobile communication system, comprising:
an absolute value generator for receiving symbols constituting a first signal generated by channel-compensating a first channel signal, and generating an absolute value of each of the symbols;
a sorter for sorting the absolute values generated by the absolute value generator in magnitude order;
a selector for selecting the absolute values in a predetermined length among the sorted absolute values, and selecting a center value of the predetermined length;
a squarer for calculating a square of an absolute value of a second signal generated by performing channel estimation using a second channel signal; and a power ratio generator for generating the power ratio by a ratio of the center value to the square of the absolute value of the second signal.

16. The apparatus of claim 15, wherein the predetermined length is a length determined by separating the sorted absolute values into a predetermined number of lengths centering on a preset reference point, selecting a length including a minimum value of the absolute values among the predetermined number of lengths, and selecting a preset length from the selected length.

17. The apparatus of claim 16, wherein the reference point is determined according to a modulation scheme of the first channel.

18. The apparatus of claim 16, wherein the preset length includes absolute values determined by excluding a preset number of absolute values among absolute values existing in the selected length in descending order from a maximum value and a preset number of absolute values among the absolute values existing in the selected length in ascending order from a minimum value.

19. An apparatus for detecting a power ratio between a first channel and a second channel in a mobile communication system, comprising:
a channel estimator for generating a first signal by performing channel estimation using a first channel signal;
a channel compensator for generating a second signal by channel-compensating a second channel signal using the first signal; and
a power ratio detector for generating absolute values of symbols constituting the second signal, calculating an average value of the absolute values, calculating a ½ value of the average value, and then generating the power ratio by a ratio of the ½ average value to a square of an absolute value of the second signal.

20. The apparatus of claim 19, wherein the power ratio detector comprises:
an absolute value generator for receiving the symbols constituting the second signal and generating an absolute value of each of the symbols;
an ½ average value calculator for calculating the average value of the absolute values and calculating the ½ value of the average value;
a squarer for calculating a square of an absolute value of the first signal; and
a power ratio generator for generating the power ratio by a ratio of the ½ average value to the square of the absolute value of the first signal.

21. An apparatus for generating a power ratio between a first channel and a second channel in a mobile communication system, comprising:
an absolute value generator for receiving symbols constituting a first signal generated by channel-compensating a first channel signal;
a ½ average value calculator for calculating an average value of the absolute values and calculating a ½ value of the average value;
a squarer for calculating a square of an absolute value of a second signal generated by performing channel estimation using a second channel signal; and
a power ratio generator for generating the power ratio by a ratio of the ½ average value to the square of the absolute value of the second signal.

22. A method for detecting a power ratio between a first channel and a second channel in a mobile communication system, comprising the steps of:
generating a first signal by performing channel estimation using a first channel signal;
generating a second signal by channel-compensating a second channel signal using the first signal; and
generating absolute values of symbols constituting the second signal, selecting absolute values in a predetermined length after sorting the absolute values in magnitude order, calculating an average value of the selected absolute values, calculating a square of an absolute value of the first signal, and generating the power ratio using a ratio of the average value to the square of the absolute value of the first signal.

23. The method of claim 22, wherein the predetermined length is a length determined by separating the sorted absolute values into a predetermined number of lengths centering on a preset reference point, selecting a length including a minimum value of the absolute values among the predetermined number of lengths, and selecting a preset length from the selected length.

24. The method of claim 23, wherein the reference point is determined according to a modulation scheme of the second channel.

25. The method of claim 23, wherein the preset length includes absolute values determined by excluding a preset number of absolute values among absolute values existing in the selected length in descending order from a maximum value and a preset number of absolute values among the absolute values existing in the selected length in ascending order from a minimum value.

26. A method for detecting a power ratio between a first channel and a second channel in a mobile communication system, comprising the steps of:
generating an absolute value of each of symbols constituting a first signal generated by channel-compensating a first channel signal;
sorting the absolute values in magnitude order;
selecting absolute values in a predetermined length among the sorted absolute values, and calculating an average value of the selected absolute values;
calculating a square of an absolute value of a second signal generated by performing channel estimation using a second channel signal; and
generating the power ratio by a ratio of the average value to the square of the absolute value of the second signal.

27. The method of claim 26, wherein the predetermined length is a length determined by separating the sorted absolute values into a predetermined number of lengths centering on a preset reference point, selecting a length including a minimum value of the absolute values among the predetermined number of lengths, and selecting a preset length from the selected length.

28. The method of claim 27, wherein the reference point is determined according to a modulation scheme of the first channel.

29. The method of claim 27, wherein the preset length includes absolute values determined by excluding a preset number of absolute values among absolute values existing in the selected length in descending order from a maximum value and a preset number of absolute values among the absolute values existing in the selected length in ascending order from a minimum value.

30. A method for detecting a power ratio between a first channel and a second channel in a mobile communication system, comprising the steps of:
generating a first signal by performing channel estimation using a first channel signal;
generating a second signal by channel-compensating a second channel signal using the first signal; and generating absolute values of symbols constituting the second signal, selecting absolute values in a predetermined length after sorting the absolute values in magnitude order, calculating a center value of the predetermined length, calculating a square of an absolute value of the first signal, and generating the power ratio using a ratio of the center value to the square of the absolute value of the first signal.

31. The method of claim 30, wherein the predetermined length is a length determined by separating the sorted absolute values into a predetermined number of lengths centering on a preset reference point, selecting a length including a minimum value of the absolute values among the predetermined number of lengths, and selecting a preset length from the selected length.

32. The method of claim 31, wherein the reference point is determined according to a modulation scheme of the second channel.

33. The method of claim 31, wherein the preset length includes absolute values determined by excluding a preset number of absolute values among absolute values existing in the selected length in descending order from a maximum value and a preset number of absolute values among the absolute values existing in the selected length in ascending order from a minimum value.

34. A method for detecting a power ratio between a first channel and a second channel in a mobile communication system, comprising the steps of:
generating an absolute value of each of symbols constituting a first signal generated by channel-compensating a first channel signal;
sorting the generated absolute values in magnitude order;
selecting absolute values in a predetermined length among the sorted absolute values and selecting a center value of the predetermined length;
calculating a square of an absolute value of a second signal generated by performing channel estimation using a second channel signal; and
generating the power ratio by a ratio of the center value to the square of the absolute value of the second signal.

35. The method of claim 34, wherein the predetermined length is a length determined by separating the sorted absolute values into a predetermined number of lengths centering on a preset reference point, selecting a length including a minimum value of the absolute values among the predetermined number of lengths, and selecting a preset length from the selected length.

36. The method of claim 35, wherein the reference point is determined according to a modulation scheme of the first channel.

37. The method of claim 35, wherein the preset length includes absolute values determined by excluding a preset number of absolute values among absolute values existing in the selected length in descending order from a maximum value and a preset number of absolute values among the absolute values existing in the selected length in ascending order from a minimum value.

38. A method for detecting a power ratio between a first channel and a second channel in a mobile communication system, comprising the steps of:
generating a first signal by performing channel estimation using a first channel signal;
generating a second signal by channel-compensating a second channel signal using the first signal; and
generating absolute values of symbols constituting the second signal, calculating an average value of the absolute values, calculating a ½ value of the average value, and then generating the power ratio by a ratio of the ½ average value to a square of an absolute value of the first signal.

39. A method for detecting a power ratio between a first channel and a second channel in a mobile communication system, comprising the steps of:
generating an absolute value of each of the symbols constituting a first signal generated by channel-compensating a first channel signal;
calculating an average value of the absolute values and calculating a ½ value of the average value;
calculating a square of an absolute value of a second signal generated by performing channel estimation using a second channel signal; and
generating the power ratio by a ratio of the ½ average value to the square of the absolute value of the second signal.

* * * * *